US011208256B2

(12) United States Patent
Jang et al.

(10) Patent No.: US 11,208,256 B2
(45) Date of Patent: Dec. 28, 2021

(54) SPRAYING VESSEL CAPABLE OF RELIEVING OVERPRESSURE AND VALVE ASSEMBLY THEREOF

(71) Applicant: SEUNG IL CORPORATION, Incheon (KR)

(72) Inventors: Hajin Jang, Incheon (KR); Changhee Koh, Incheon (KR); Kihong Lee, Incheon (KR)

(73) Assignee: SEUNG IL CORPORATION, Incheon (KR)

( * ) Notice: Subject to any disclaimer, the term of this patent is extended or adjusted under 35 U.S.C. 154(b) by 0 days.

(21) Appl. No.: 16/954,572

(22) PCT Filed: Jul. 27, 2018

(86) PCT No.: PCT/KR2018/008546
§ 371 (c)(1),
(2) Date: Jun. 17, 2020

(87) PCT Pub. No.: WO2019/198880
PCT Pub. Date: Oct. 17, 2019

(65) Prior Publication Data
US 2020/0331689 A1 Oct. 22, 2020

(30) Foreign Application Priority Data

Apr. 13, 2018 (KR) .................. 10-2018-0043503
May 17, 2018 (KR) .................. 10-2018-0056601
Jul. 2, 2018 (KR) .................. 10-2018-0076609

(51) Int. Cl.
*B65D 83/70* (2006.01)
*B05B 7/12* (2006.01)
(Continued)

(52) U.S. Cl.
CPC ............ *B65D 83/70* (2013.01); *B05B 7/1209* (2013.01); *B05B 7/24* (2013.01); *B65D 83/48* (2013.01); *F16K 31/002* (2013.01); *F03G 7/065* (2013.01)

(58) Field of Classification Search
CPC .......... B65D 83/70; B65D 83/48; B05B 7/24; F17C 13/04; F17C 13/12; F16K 31/002; F16K 17/38; F16K 1/306
(Continued)

(56) References Cited

U.S. PATENT DOCUMENTS 10,633,167 B2 * 4/2020 Kim ..................... B65D 83/48

FOREIGN PATENT DOCUMENTS

JP          2530076 Y2    3/1997
JP     2010-03 8278 A    2/2010
(Continued)

OTHER PUBLICATIONS

International Search Report dated Jan. 29, 2019 in corresponding PCT International Application No. PCT/KR2018/008546.
(Continued)

*Primary Examiner* — Lien M Ngo
(74) *Attorney, Agent, or Firm* — Ostrolenk Faber LLP

(57) ABSTRACT

The present invention relates to a spraying vessel and a valve assembly comprising the same, the spraying vessel comprising: a housing provided with an upper sealing cap for sealing an upper portion and a receiving space for receiving contents; a mount cup, mounted on the upper sealing cap, having a through hole formed in a central portion thereof; a stem housing provided with a mounting portion, mounted to the mount cup, having a hollow portion formed therein, and a communication flow path for making the hollow portion be in communication with the receiving space; a valve stem which is installed to pass through the through hole and slide in the hollow portion, and is provided with an orifice being configured to selectively communicate with the hollow portion by a sliding motion; and a flow path blocking valve formed to block an inlet of the communication flow path.

15 Claims, 25 Drawing Sheets

(51) Int. Cl.
*B05B 7/24* (2006.01)
*B65D 83/48* (2006.01)
*F16K 31/00* (2006.01)
*F03G 7/06* (2006.01)

(58) Field of Classification Search
USPC ....... 222/396, 394, 397, 399, 402.2, 402.24, 222/402.25
See application file for complete search history.

(56) References Cited

FOREIGN PATENT DOCUMENTS

| KR | 10-1281536 | * | 6/2013 |
| KR | 10-2014-0105690 A | | 9/2014 |
| KR | 10-2016-0041368 A | | 4/2016 |
| KR | 10-1714502 B1 | | 3/2017 |
| WO | WO 2016/013783 | * | 1/2016 |

OTHER PUBLICATIONS

Written Opinion dated Jan. 29, 2019 in corresponding PCT International Application No. PCT/KR2018/008546.

* cited by examiner

SPRAYING VESSEL CAPABLE OF RELIEVING OVERPRESSURE AND VALVE ASSEMBLY THEREOF

CROSS-REFERENCE TO RELATED APPLICATION

The present application is a 35 U.S.C. §§ 371 national phase conversion of PCT/KR2018/008546, filed Jul. 27, 2018, which claims priority to Korean Patent Application Nos. 10-2018-0043503, 10-2018-0056601, and 10-2018-0076609, filed Apr. 13, 2018, May 17, 2018, and Jul. 2, 2018, respectively, the entire disclosure of all of which are incorporated herein by reference.

TECHNICAL FIELD

The present invention relates to an injection container capable of relieving an overpressure state.

BACKGROUND ART

In general, an injection container refers to a vessel in which contents (fluid or gas) to be injected are sealed inside a housing so that the contents can be injected to the outside using an internal pressure. Representative examples of such injection containers include portable gas containers, insecticidal sprays, hair sprays, portable aerosol extinguishers, gas lighter containers, and the like.

Typically, the injection container includes a housing (can) for filling the contents, a mounting cup secured to an upper end of the housing, and a valve assembly secured to a central protruding part of the mounting cup. In particular, the valve assembly is configured to maintain a closed state when the injection container is not in use and to discharge a certain amount of the contents when used.

Meanwhile, the injection container may reach an overpressure state for thermal, mechanical, or chemical reasons during use or storage. However, a malfunction (such as expansion and deformation) of the injection container occurs when the injection container reaches the overpressure state because the valve assembly is configured to maintain the closed state or discharge the certain amount of the contents even if the overpressure state.

The problems, such as an explosion of the injection container or reaching into a dangerous situation, may occur due to the malfunction of the injection container. Thus, conventionally, a method has been used to add various structures for discharging the overpressure gas to the outside. However, these structures have a problem where another type of safety accident occurs because these structures instantaneously discharge the massive amount of overpressurized gas.

Thus, the present invention proposes an apparatus to prevent an overpressure state without discharging the gas of injection container to the outside and mechanism thereof in order to prevent malfunction of the injection container.

DISCLOSURE

Technical Problem

An object of the present invention is to provide an injection container and a valve assembly thereof capable of overpressure relief before a malfunction occurs due to overpressure by providing an overpressure relief mechanism which is different from the prior art.

Another object of the present invention is to provide an injection container and its valve assembly thereof capable of preventing the internal structure from easily deforming in case where shock is applied to the outside.

Another object of the present invention is to provide injection container and its valve assembly thereof capable of preventing a risk of safety accident by effectively preventing discharge of gas inside the injection container to the outside.

Technical Solution

To achieve the purposes of the present invention, there is provided an injection container according to an embodiment of the present invention, the injection container comprising: a housing having an upper sealing cap for sealing an upper portion and an accommodating space for containing contents; a mounting cup mounted on the upper sealing cap, wherein a through hole is formed at a central part thereof; a stem housing having a mounting portion mounted on the mounting cup and a communication flow path to communicate with the hollow portion and the accommodating space, wherein a hollow portion is formed inside the mounting portion; a valve stem formed to pass through the through hole, slidably disposed in the hollow portion, and providing an orifice to selectively communicate with the hollow portion by sliding; and a flow path blocking valve for moving a blocking member to block an inlet of the communication flow path by applying an external force to the blocking member when an internal temperature of the accommodating space rises above a preset temperature.

According to an embodiment of the present invention, the flow path blocking valve may include: a body for containing the blocking member therein, and providing at least one cantilever portion formed in a cantilever shape, the body formed in a cylindrical shape and disposed to be inserted into the inlet of the communication flow path; and a ring member having one side supported by a locking portion protruding from the cantilever portion, and having the other side disposed to contact the blocking member. The ring member may move the blocking member towards the inside of the communication flow path by deforming the blocking member to pass through a central part of the ring member when the internal temperature exceeds the preset temperature.

According to an embodiment of the present invention, a lower end portion of the ring member may contact the locking portion. And an upper end portion of the ring member may prevent the blocking member from moving in a direction of gravity, by being arranged to contact the blocking member.

According to an embodiment of the present invention, the blocking member may be released from a locked state to the cantilever portion by bending of the cantilever portion due to a deformation of the ring member, and may be configured to be inserted into the communication flow path after moving towards the inlet of the communication flow path.

According to an embodiment of the present invention, a supporting portion may be formed to protrude from an inner circumferential surface of the body corresponding to an outer circumferential surface shape of the blocking member to fix a position of the blocking member at one side of the cantilever portion.

According to an embodiment of the present invention, the ring member may be provided as a shape memory alloy which is deformed in appearance when the temperature rises above the preset temperature. The ring member may be formed in a ring shape such that both ends are spaced apart from each other. And the ring member may be deformed to apply an external force toward a radial direction when the internal temperature rises above the preset temperature.

According to an embodiment of the present invention, the blocking member within the body may be arranged at an inner side than the ring member.

According to an embodiment of the present invention, one side of an inner circumferential surface of the body may be connected to the inlet of the communication flow path, and the other side of the inner circumferential surface may be connected to the accommodating space such that the communication flow path may be blocked by movement of the blocking member.

According to an embodiment of the present invention, the flow path blocking valve may include: a body for containing the blocking member therein, and providing at least one cantilever portion formed in a cantilever shape, the body formed in a cylindrical shape to be inserted into the inlet of the communication flow path; a spring arranged inside the body and formed to apply an external force towards a direction of the blocking member; and a locking portion protruding in the cantilever portion to lock the movement of the blocking member towards the direction. Here, the blocking member within the body may be arranged at an outer side than the spring. And the blocking member may move towards the inlet of the communication flow path to block the inlet of the communication flow path due to a release of the locking of the blocking member by bending of the cantilever portion when the temperature rises above the preset temperature.

According to an embodiment of the present invention, the body may include a plurality of grooves, and the plurality of grooves may be separated apart from each other toward a circumferential direction along an outer circumferential surface of the body to form at least one of the cantilever portions.

According to an embodiment of the present invention, the cantilever portion may be formed of a thermally-deformable material so as to be bendable above a certain temperature.

According to an embodiment of the present invention, the flow path blocking valve may include: a supporting portion to fix a position of the spring such that the spring expands in one direction. And the supporting portion may be arranged apart from the locking portion, and may be formed in a shape that an inner circumferential surface of the body protrudes toward inside of the body.

According to an embodiment of the present invention, the flow path blocking valve may include: a body inserted into the inlet of the communication flow path; and a shape memory alloy arranged in the body and applying an external force to an inner circumferential surface of the body by being deformed when the internal temperature of the accommodating space rises above the preset temperature. Here, the blocking member may be located to be locked by a locking portion formed in the body, and may move to block the inlet of the communication flow path as its locking state is released when the locking portion is deformed by an external force.

According to an embodiment of the present invention, the blocking member may be arranged between the locking portion and the shape memory alloy. One end portion close to the inlet of the communication flow path and other end portion located in an opposite direction thereto may be formed at the body, and the shape memory alloy may be disposed at the other end portion.

According to an embodiment of the present invention, the body may be formed such that at least a part of the inner circumferential surface may be roundly protruded towards a center of the inside of the body so as to lock the blocking member. And one side of the inner circumferential surface of the body may be connected with the inlet of the communication flow path, and the other side of the inner circumferential surface may be connected with the accommodating space so that the blocking member may reach the inlet.

According to an embodiment of the present invention, the shape memory alloy may be formed in a ring shape having both ends thereof spaced apart from each other. And the shape memory alloy may apply an external force in a direction away from the center of the inner circumferential surface as said both ends are separated from each other when the internal temperature of the accommodating space rises above the preset temperature.

To achieve the purposes of the present invention, there is also provided a valve assembly mounted to a mounting cup fixed to an upper end of a housing, wherein the valve assembly includes: a stem housing having a mounting portion mounted onto the mounting cup, and a communication flow path to communicate the hollow portion with the accommodating space, wherein the hollow portion is formed inside the mounting portion; a valve stem having one side passing through a central part of the mounting cup and the other side slidably arranged in the hollow portion, and the valve stem is provided with an orifice to selectively communicate with the hollow portion by sliding; and a flow path blocking valve for moving the blocking member to block an inlet of the communication flow path by applying an external force to the blocking member when an internal temperature of the accommodating space rises above a preset temperature.

According to an embodiment of the present invention, the flow path blocking valve may include: a body for containing the blocking member therein, and providing at least one cantilever portion formed in a cantilever shape, the body formed in a cylindrical shape and disposed to be inserted into the inlet of the communication flow path; and a ring member having one side supported by a locking portion protruding from the cantilever portion and the other side disposed to contact the blocking member. Here, the ring member may move the blocking member towards the inside of the communication flow path by deforming the blocking member to pass through a central part of the ring member when the internal temperature exceeds the preset temperature.

According to an embodiment of the present invention, the flow path blocking valve may include: a body for containing the blocking member therein, and providing at least one cantilever portion formed in a cantilever shape, the body formed in a cylindrical shape and disposed to be inserted into the inlet of the communication flow path; a spring arranged inside the body and formed to apply an external force towards a direction to the blocking member; and a locking portion protruding from the cantilever portion to lock the movement of the blocking member towards the direction. Here, the blocking member within the body may be arranged at an outer side than the spring. And the blocking member may move towards the inlet of the communication flow path to block the inlet of the communication flow path due to a release of the locking of the blocking member by bending of the cantilever portion when the temperature rises above the preset temperature.

According to an embodiment of the present invention, the flow path blocking valve may include: a body inserted into the inlet of the communication flow path; and a shape memory alloy arranged in the body and applying an external force to an inner circumferential surface of the body by being deformed when the internal temperature of the accommodating space rises above the preset temperature. Here, the blocking member may be located to be locked by a locking portion formed in the body, and may move to block the inlet of the communication flow path as its locking state is released when the locking portion is deformed by an external force.

Advantageous Effect

In the injection container and the valve assembly thereof according to the present invention, if an inner temperature of the injection container rises, the flow path is blocked by the flow path blocking valve. This can solve an overpressure of the injection container, and thereby can prevent a malfunction due to an overpressure.

Further, as the inner temperature of the injection container rises, an inner diameter of the ring member is increased. This can allow the blocking member to be inserted into the communication flow path, and can operate a gas blocking mechanism more stably.

Further, since the blocking member is supported by the ring member, separation of the blocking member towards the communication flow path is prevented, even under an external impact. This can enhance the reliability of the product.

Further, the flow path blocking valve of the present invention is bent as the inner temperature of the injection container rises. Accordingly, the flow path of the communication flow path is blocked by the blocking member. This can operate a gas blocking mechanism more precisely.

Further, the flow path blocking valve is provided on the communication flow path of the stem housing, and the shape memory alloy which is deformed at a preset temperature by responding to an inner temperature of the housing is applied to the flow path blocking valve. And when the temperature of the housing reaches the preset temperature, the communication flow path is blocked by a deformation of the shape memory alloy, so that gas does not flow onto the communication flow path of the stem housing. Accordingly, an overpressure state of the injection container can be solved, and a malfunction due to an overpressure state can be prevented.

Further, the flow path blocking valve according to the present invention is formed so that the blocking member of a spherical shape free-falls towards the communication flow path. This can operate a gas blocking mechanism more precisely.

Further, since gas inside the injection container does not leak to the outside, an explosion or the occurrence of fire can be prevented.

MODES FOR CARRYING OUT THE PREFERRED EMBODIMENTS

Figure 1A:
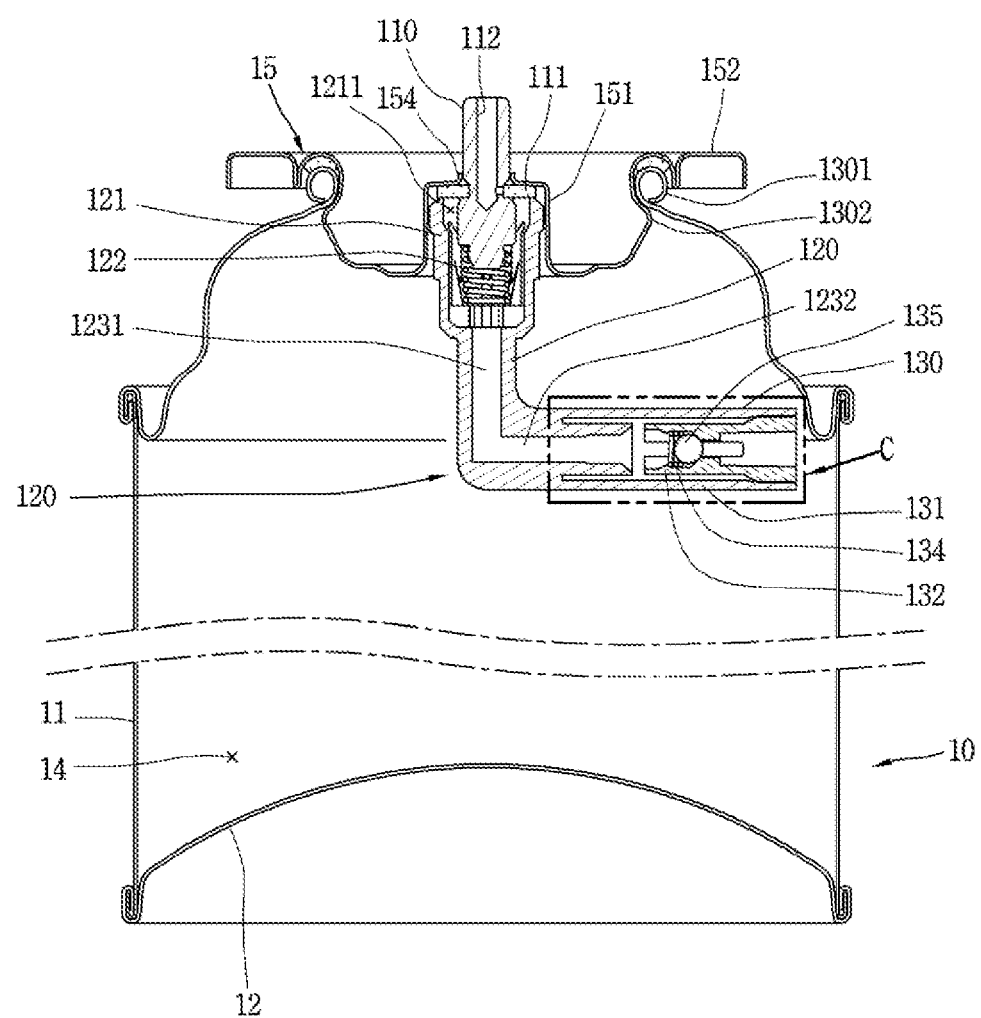
FIG. 1A is a sectional view of an injection container having a valve assembly according to the present invention, mounted thereto.

Hereinafter, a radiation source system related to the present invention and a nondestructive inspection system having the same will be explained in more detail with reference to the drawings. In the specification, the same or similar configuration even in a different embodiment will be provided with the same or similar reference numerals, and explanations thereof will be replaced by the aforementioned ones. A singular expression used in this specification includes a plural meaning unless it is used to be differentiated distinctively contextually.

FIG. 1A is a sectional view of an injection container having a valve assembly according to the present invention, mounted thereto. And FIG. 1B is a sectional view of an injection container having a valve assembly according to another embodiment of the present invention, mounted thereto.

Figure 1B:
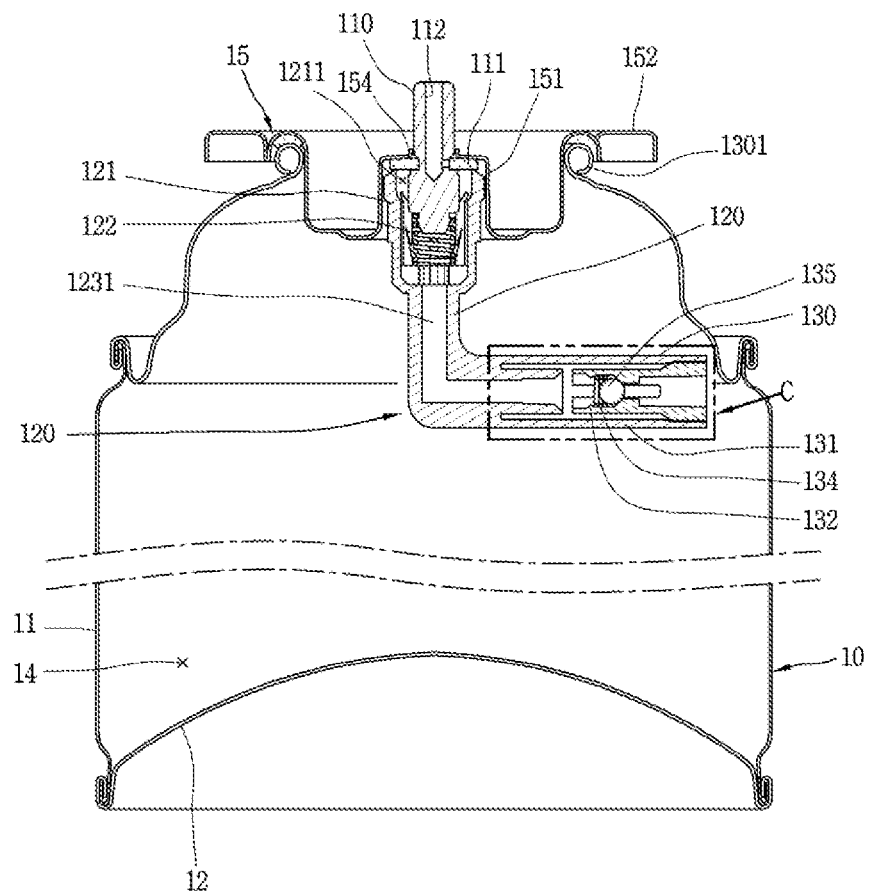
FIG. 1B is a sectional view of an injection container having a valve assembly according to another embodiment of the present invention, mounted thereto.

As shown in FIGS. 1A and 1B, an intermediate part of the injection container in a lengthwise direction was deleted by two cutting lines under a judgment that it is unrelated to the features of the present invention and it is unnecessary in explaining the present invention. However, a part of side surfaces of the injection container was deleted between the two cutting lines. Actually, the respective side surfaces of the injection container are to be connected to each other by being extended in upper and lower directions.

Referring to FIG. 1A, a housing 10 is formed in a cylindrical shape, is provided with an accommodating space 14 therein, and is configured to accommodate therein contents such as fluid or gas and spraying gas.

The housing 10 includes a body 11 having the accommodating space 14, and a lower sealing cap 12 and an upper sealing cap 13 for sealing both ends of the body 11, respectively. The lower sealing cap 12 may be formed in a shape bent towards the accommodating space 14. This may allow the lower sealing cap 12 to be deformed to increase a volume of the accommodating space 14 when an overpressure more than a predetermined level is applied to the accommodating space 14.

The upper sealing cap 13 may be coupled to the body 11 so as to seal an upper part of the body 11. The upper sealing cap 13 may form a seaming coupling portion 1301 so as to be coupled with the mounting cup 15 in a bent or rolled manner. The seaming coupling portion 1301 is formed along the edge of the mounting cup 15. The body 11 may be coupled to a lower end of the upper sealing cap 13 in a neck-in type. In this case, the body 11 may be formed so as to be extended in a straight line in a lengthwise direction.

The housing 10 may be configured to contain therein gas of a high pressure or fuel of a liquid state, and may be configured in the form of a metallic can which is capable of enduring a predetermined inner pressure. However, the present invention is not limited to this. The housing 10 may accommodate therein a pesticide, an aromatic, a beauty care product and the like.

Referring to FIG. 1A, the mounting cup 15 for supporting a valve assembly 100 is coupled to an upper end of the upper sealing cap 13.

The mounting cup 15 includes a locking shape portion 152 so as to be mounted to a fuel mounting device such as a gas range, and is provided with a protruding part 151 at an intermediate part thereof so as to fix the valve assembly 100. However, in some cases, the locking shape portion 152 may not be formed, or may be formed in another form. For instance, as another form of the locking shape portion 152, a cap having a pressing button for injection may be mounted when a beauty care product, a pesticide, etc. are contained in the housing 10.

The mounting cup 15 is formed as a locking protrusion 1302 protrudes from a lower end of the seaming coupling portion 1301 of the upper sealing cap 13. The locking protrusion 1302 may be formed as the mounting cup 15 is assembled in a clamped manner when the mounting cup 15 is coupled to an injection container accommodating portion of a gas range.

Referring to FIG. 1B, in an injection container according to another embodiment of the present invention, a lower end of the upper sealing cap 13 and the body 11 may be coupled to each other as a neck-out type. Hereinafter, for convenience, an operation method of the valve assembly 100 will be explained on the basis of the injection container of FIG. 1A. However, it will be obvious to those skilled in the art that the present invention is not limited to this but can be applied to the injection container of FIG. 1B.

Figure 2:
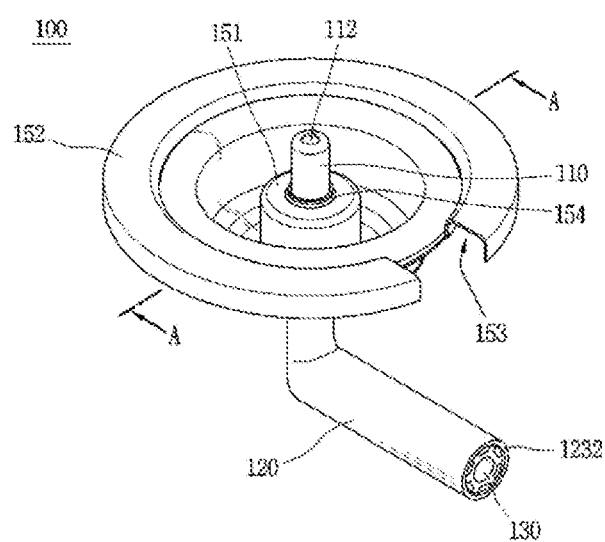
FIG. 2 is a perspective view showing a mounted state of a valve assembly to a mounting cup of FIG. 1.
Figure 3:
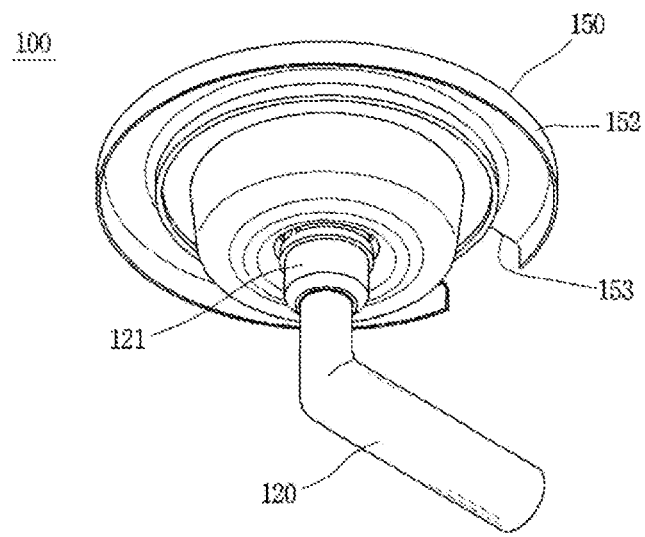
FIG. 3 is a bottom perspective view of the valve assembly of FIG. 2, which is viewed from the lower side.
Figure 4:
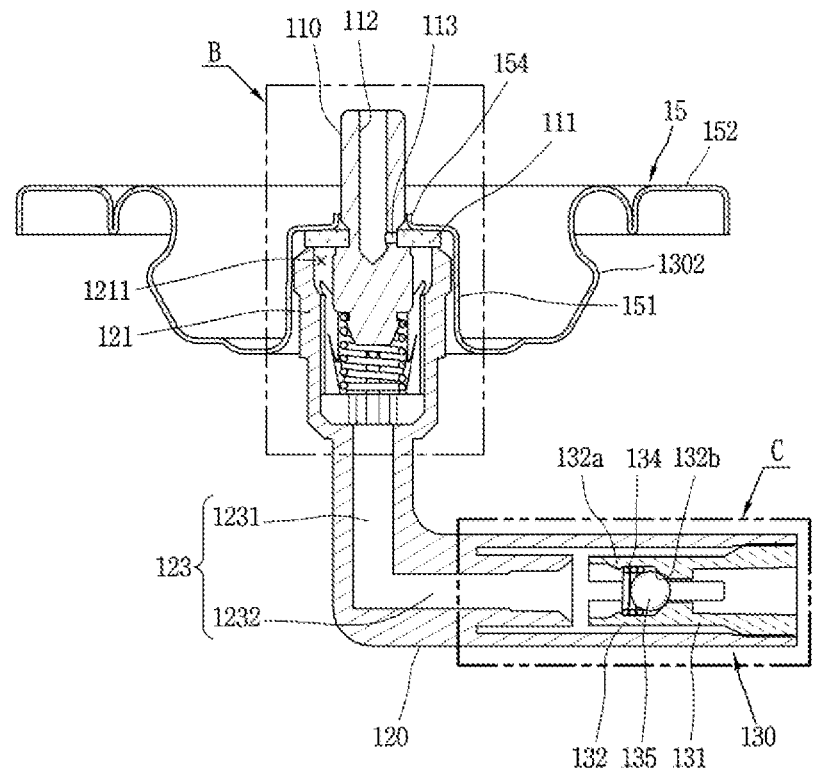
FIG. 4 is a sectional view taken along line 'A-A' in FIG. 2.
Figure 5:
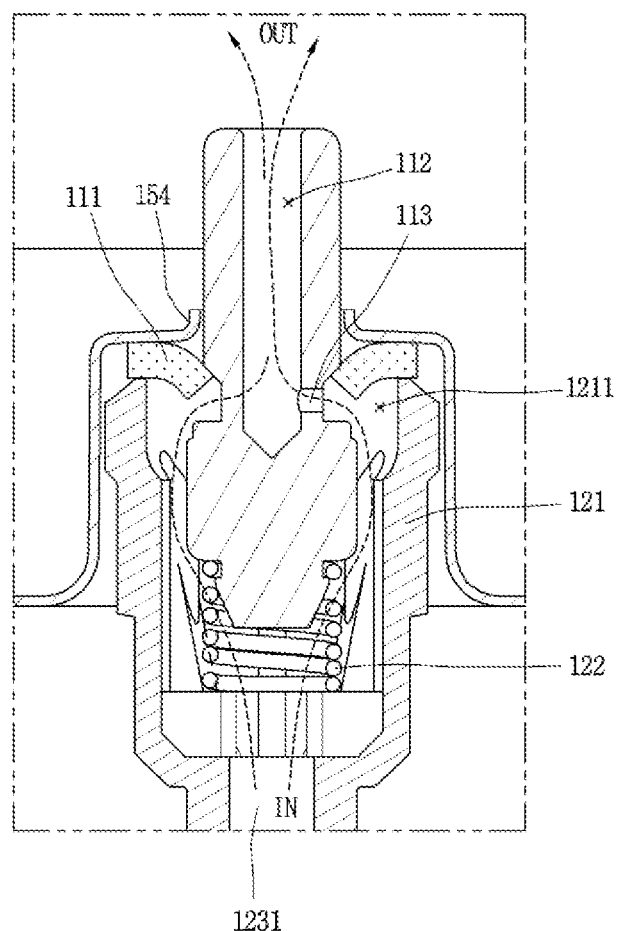
FIG. 5 is an enlarged view of 'B' in FIG. 4.

FIG. 2 is a perspective view showing a mounted state of the valve assembly 100 to the mounting cup 15 of FIG. 1. FIG. 3 is a bottom perspective view of the valve assembly 100 of FIG. 2, which is viewed from the lower side. FIG. 4 is a sectional view taken along line 'A-A' in FIG. 2, and FIG. 5 is an enlarged view of 'B' in FIG. 4.

Referring to FIG. 2, the mounting cup 15 is provided with a notch groove 153 formed at one side of the locking shape portion 152, so as to be mounted to a gas range (or an external device for mounting an injection container). When an injection container is mounted to an injection container accommodating portion of a gas range, the notch groove 153 is arranged towards an upper direction of the injection container accommodating portion.

The valve assembly 100 includes a valve stem 110 for injecting contents contained in the accommodating space 14 to the outside by being pressed, and a stem housing 120.

A through hole 154 is formed at an intermediate part of an upper end of the protruding part 151 of the mounting cup 15. An opening/closing member 111 of a ring shape is mounted to an inner side surface of the upper end of the protruding part 151 of the mounting cup 15, so as to cover a part of the through hole 154.

The valve stem 110 is mounted to the upper end of the protruding part 151 of the mounting cup 15, so as to be slidable in upper and lower directions by the opening/closing member 111. An upper part of the valve stem 110 is exposed to the outside of the housing 10 by passing through a central hole of the opening/closing member 111 and the through hole 154. A lower part of the valve stem 110 is arranged to be accommodated in the upper end of the protruding part 151 of the mounting cup 15. A coupling groove is formed at a side surface of the valve stem 110 in a circumferential direction, and an inner circumferential part of the opening/closing member 111 is inserted into the coupling groove. And the valve stem 110 may be supported by the opening/closing member 111 so as to be slidable in upper and lower directions.

An air discharge hole 112 is formed at an upper end of the valve stem 110 towards a directly downward direction, and an orifice 113 is formed between a lower end of the air discharge hole 112 and the coupling groove. And the air discharge hole 112 may be communicated with the accommodating space 14 of the housing 10 through the orifice 113. Here, the opening/closing member 111 encloses the coupling groove of the valve stem 110, and may selectively open or close the orifice 113 by sliding of the valve stem 110.

The stem housing 120 may includes a mounting portion 121 having a hollow portion 1211 therein, and a communication flow path 123 for communicating the hollow portion 1211 with the accommodating space 14 of the housing 10. The hollow portion 1211 may be selectively communicated with the air discharge hole 112 through the orifice 113.

A part of the mounting portion 121 is accommodated in the protruding part 151 of the mounting cup 15, and is provided with the hollow portion 1211 therein. Accordingly, a lower part of the valve stem 110 is arranged at the hollow portion 1211 so as to be slidable. Here, an upper end of the mounting portion 121 is configured to support an outer circumferential part of the opening/closing member 111.

A valve spring 122 is provided in the mounting portion 121, and the valve spring 122 is configured to elastically support the lower part of the valve stem 110.

The communication flow path 123 is provided in the stem housing 120, and is configured to communicate the hollow portion 1211 and the accommodating space 14 of the housing 10 with each other.

The communication flow path 123 may include a first communication flow path portion 1231 extended in the same or similar direction as/to a lengthwise direction of the housing 10 or a sliding direction of the valve stem 110, and a second communication flow path portion 1232 extended from the first communication flow path portion 1231 in a side direction of the housing 10. The second communication flow path portion 1232 may be extended in a direction to cross a side surface of the housing 10. An upper end of the first communication flow path portion 1231 may be communicated with the hollow portion 1211, and an end part of the second communication flow path portion 1232 may be communicated with the accommodating space 14 by being arranged to be spaced from the upper sealing cap 13.

A gas discharge operation of the valve assembly 100 will be explained with reference to FIG. 5.

When the injection container is mounted to an injection container accommodating portion of a gas range (or an external device) in a lying manner horizontally, the notch groove 153 of the mounting cup 15 is arranged towards an upper direction of the injection container accommodating portion, and the second communication flow path portion 1232 of the stem housing 120 is also arranged towards the upper direction.

In case of an injection container using liquid fuel, liquid fuel may sink in a gravitational direction while it is being used. And gas fuel evaporated to an upper space of the accommodating space 14 on the basis of a virtual lengthwise central line of the housing 10 may be introduced into the hollow portion 1211 through the second communication flow path portion 1232 and the first communication flow path portion 1231.

The valve stem 110 may be pressurized in a lengthwise direction of the housing 10. By the pressurization, the valve spring 122 is compressed and the valve stem 110 is slid towards the accommodating space 14. The inner circumferential part of the opening/closing member 111 is pushed to the accommodating space 14 by the sliding of the valve stem 110. Accordingly, the orifice 113 is opened, so that the gas fuel in the accommodating space 14 may be outwardly injected through the valve stem 110 at the hollow portion 1211 of the stem housing 120. When the pressurization is released, the injection of the contents may be stopped.

The valve assembly 100 of the present invention may include a flow path blocking valve 130 formed to block an inlet of the communication flow path of the stem housing, in order to relieve an overpressure state of the accommodating space 14.

Figure 6:
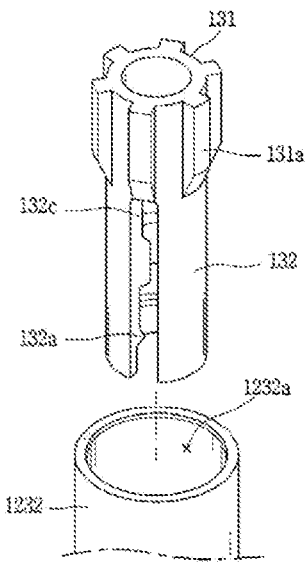
FIG. 6 is a perspective view of a flow path blocking valve according to the present invention.
Figure 7:
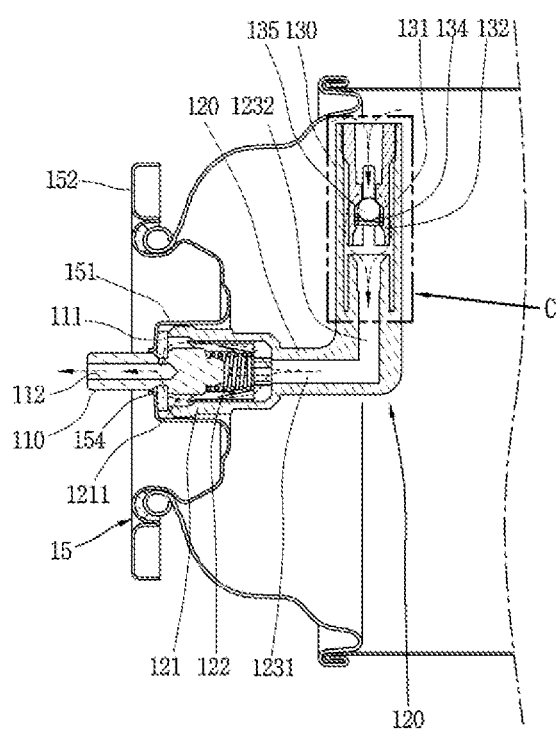
FIG. 7 is a conceptual view of an injection container having a flow path blocking valve mounted thereto.
Figure 8:
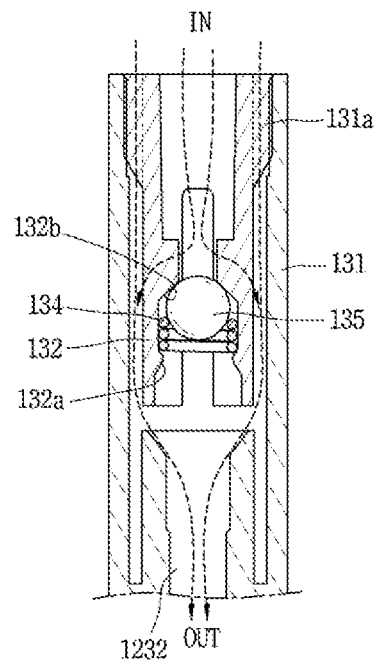
FIG. 8 is an enlarged view of 'C' in FIG. 7.

FIG. 6 is a perspective view of the flow path blocking valve according to the present invention. FIG. 7 is a conceptual view of an injection container having the flow path blocking valve mounted thereto. And FIG. 8 is an enlarged view of 'C' in FIG. 7.

The injection container according to the present invention may be configured to block the stem housing 120 so that contents inside the accommodating space 14 of the housing 10 may not leak to the outside through the flow path blocking valve 130, when the injection container reaches an overpressure state due to thermal, mechanical or chemical reasons during usage or storage. The flow path blocking valve 130 may be installed at the valve assembly 100 so as to be inserted thereinto, in order to prevent an overpressure state inside the accommodating space 14.

The flow path blocking valve 130 is installed to be inserted into the communication flow path 123 of the stem housing 120 in parallel, thereby serving to selectively block a point of a passage where gas inside the accommodating space 14 is discharged to the outside. Here, the flow path blocking valve 130 may be installed at a part of the second communication flow path 1232 which is arranged in a gravitational direction, for movement of a blocking member 135 in a gravitational direction.

As shown in FIG. 7, when the injection container is mounted to an injection container accommodating portion of a gas range (or an external device) in a lying manner horizontally, the flow path blocking valve 130 may be arranged so that the notch groove 153 of the mounting cup 15 is towards an upper direction of the injection container accommodating portion, and the second communication flow path portion 1232 of the stem housing 120 is also towards the upper direction.

Here, the flow path blocking valve 130 may be inserted into a hollow portion 1232a (refer to FIG. 6) of the second communication flow path portion 1232 which is arranged towards an upper direction (that is, a gravitational direction). Since the flow path blocking valve 130 is arranged in a gravitational direction, a blocking member 135 disposed in the flow path blocking valve 130 is moved by gravity towards the inlet of the communication flow path 123. As a result, an overpressure state may be relieved as the communication flow path 123 is blocked.

The flow path blocking valve 130 may be configured to include a body 131, a blocking member 135, and a ring member 134.

The body 131 is formed to have a cylindrical shape, and may be installed to be inserted into the inlet of the communication flow path 123. The body 131 may be provided with a hollow portion therein so that contents inside the accommodating space 14 are discharged to the outside of the housing 10 through the flow path blocking valve 130.

As shown in FIG. 6, a plurality of protrusions 131a may be formed on an outer circumferential surface of the body 131 at positions spaced from each other, so as to be fitted into the communication flow path 123. Each protrusion 131a serves to fix a position when the flow path blocking valve 130 is inserted into the communication flow path 123. Since the plurality of protrusions 131a are installed to contact an inner circumferential surface of the communication flow path 123, contents inside the accommodating space 14 may be moved to the communication flow path 123 of the stem housing 120, through a space between the plurality of protrusions 131a and the communication flow path 123.

The body 131 may be provided with at least one cantilever portion 132 formed in a cantilever shape, and the cantilever portion 132 divided by a plurality of grooves 132c arranged in a circumferential direction along an outer circumferential surface in a spaced manner. The groove 133 and the cantilever portion 132 may be extended in a lengthwise direction of the body 131.

The cantilever portion 132 serves to support the blocking member 135 and the ring member 134, and may be bent partially in a radius direction when an external force is applied thereto.

The cantilever portion 132 may be formed of a plastically deformable material. That is, the cantilever portion 132 may be formed of a material which can be bent or curved by heat. For instance, the cantilever portion 132 may be formed of a thermoplastic material, such as poly-oxy-methylene (POM), polyethylene (PE), polypropylene (PP), polystylene (PS), polyvinychloride (PVC), acrylonitrile butadien styrene resin (ABS resin), polyamide (PA), polycarbonate (PC), polyphenylesulfied (PPS), polyetheretherketone (PEEK), and polytetrafluoroethylene (PTFE).

The cantilever portion 132 may be provided with a locking portion 132a protruding from an inner side surface of the cantilever portion 132, in order to restrict separation of a lower end of the ring member 134 in a gravitational direction. One end of the ring member 134 is supported by contacting the locking portion 132a.

The locking portion 132a may be protruded in a round shape so that a part of an inner circumferential surface of the cantilever portion 132 is towards the center inside the body 131, and may be formed in a bent manner. Alternatively, the locking portion 132a may have a shape protruding from the end of the cantilever portion 132 adjacent to the inlet of the communication flow path 123 when the flow path blocking valve 130 is inserted into the communication flow path 123. Since the locking portion 132a supports the ring member 134, the blocking member 135 positioned at an upper end of the ring member 134 is restricted from moving towards the inlet of the communication flow path 123. The locking portion 132a may be protruded in various shapes including a trapezoidal shape, a triangular shape, etc. as well as a rounded shape.

The blocking member 135 is accommodated in the body 131, which may be positioned at an upper end of the ring member 134. The upper end means a direction perpendicular to a horizontal direction where the injection container is positioned in a lying manner when mounted to a fuel mounting device. That is, the blocking member 135 is positioned at an outer side of the communication flow path 123 than the ring member 134.

The blocking member 135 may mean a ball of a spherical shape or a steel ball. However, the blocking member 135 may be formed to have a polyhedral shape which can block the inlet of the communication flow path, as well as the spherical shape.

The blocking member 135 is positioned at an outer side of the communication flow path 123 than the ring member 134, and the position may be an upper end of the ring member 134. Since the blocking member 135 is positioned above the ring member 134, it is supported by the upper end of the ring member 134. Accordingly, when the ring member 134 has a temperature less than a preset level, the blocking member 135 cannot block the communication flow path 123. In this case, gas inside the accommodating space 14 may move towards the communication flow path 123.

When the ring member 134 has a temperature more than a preset level as the temperature of the accommodating space rises, the blocking member 135 free-falls towards the inside of the communication flow path 123, by passing through a hole formed at a central part of the ring member 134. And the blocking member 135 is inserted into the communication flow path 123, thereby blocking the communication flow path 123. The blocking member 135 inserted into the communication flow path 123 may prevent gas from moving through the communication flow path 123 even under an external impact. Further, since the blocking member 135 is supported by the ring member 134, when an external impact is applied to the injection container, the blocking member 135 is prevented from being separated towards the communication flow path 123 in a state other than an overpressure state of the inner space. This may enhance the reliability of the product.

A diameter of the blocking member 135 may be formed to be larger than a diameter of the hole formed at the central part of the ring member 134, but smaller than a diameter up to an outer lateral end of the ring member 134.

The diameter of the blocking member 135 may be formed to be larger than a diameter up to an inner side surface of the communication flow path 123, so that the blocking member 135 is inserted into the communication flow path 123 by passing through the hole formed at the ring member 134, and so that the blocking member 135 blocks the inlet of the communication flow path 123 by being closely attached to an inner side surface of the communication flow path 123.

A supporting portion 132b is formed at one side of the cantilever portion 132, by protruding from an inner circumferential surface of the body 131 in correspondence to a shape of an outer side surface of the blocking member 135, thereby fixing a position of the blocking member 135. The supporting portion 132b is arranged to be spaced apart from the locking portion 132a, and the ring member 134 and the blocking member 135 are positioned at a space between the locking portion 132a and the supporting portion 132b. The supporting portion 132b is positioned to contact an outer side surface of the blocking member 135, and may apply an external force in a gravitational direction to the blocking member 135. The ring member 134 may be supported more strongly at the locking portion 132a by a force applied to the blocking member 135.

The ring member 134 is arranged in the body 131, and may be installed so that one side thereof is supported by the locking portion 132a protruding from the cantilever portion 132, and another side thereof contacts the blocking member 135. More specifically, a lower end of the ring member 134 is arranged to contact the locking portion 132a, and an upper end of the ring member 134 is arranged to contact the blocking member 135. This may restrict a movement of the blocking member 135 in a gravitational direction.

When an inner temperature of the accommodating space 14 is more than a preset temperature, the ring member 134 may be deformed to apply an external force to an inner circumferential surface of the body 131.

The ring member 134 may be attached to the inner circumferential surface so as to apply an external force to the inner circumferential surface, or may be arranged close to the inner circumferential surface. Here, the external force means a force applied in a direction away from the center of the inner circumferential surface. When an external force is applied to the inner circumferential surface, at least part of the body 131 is bent.

The ring member 134 is formed in a ring shape so that both ends thereof are spaced apart from each other in a spaced manner. And the ring member 134 may be deformed to apply an external force in a radius direction, that is, in a direction away from the center of the inner circumferential surface, when the inner temperature is more than the preset temperature.

The ring member 134 may be formed of a shape memory alloy which can be deformed at a temperature more than a preset temperature.

When the temperature of the ring member 134 is more than a preset temperature as an inner temperature of the accommodating space 14 rises, the ring member 134 may be deformed to have its diameter increased so that the blocking member 135 passes through a central part of the ring member 134. In the case that the ring member 134 is deformed, the blocking member 135 may move towards the inside of the communication flow path 123. More specifically, the blocking member 135 positioned at the upper end of the ring member passes through the hole formed at the central part of the ring member 134, and free-falls in a gravitational direction, thereby blocking the communication flow path.

According to another embodiment of the present invention, the cantilever portion 132 may be formed of a thermally-deformable material so that a part thereof can be bent at a temperature more than a preset temperature. In this case, when the temperature of the accommodating space 14 rises, the cantilever portion 132 is also deformable in correspondence to the deformation of the ring member 134. This may allow the blocking member 135 to move into the communication flow path 123 more smoothly by the deformation of the ring member 134.

The ring member 134 may be formed in a ring shape, and may have a shape that a plurality of rings are connected to each other. Alternatively, the ring member 134 may be formed in a 'C' shape that one side thereof is cut-out. In this case, if the inner temperature of the accommodating space rises above a preset temperature, both ends of the ring member 134 may be spaced apart from each other. In the case that the cut-out both ends of the ring member 134 are spaced apart from each other, the inner circumferential surface of the body 131 may be pressurized outwardly, and thus the cantilever portion 132 may be widened in a radius direction. As aforementioned, even if the ring member 134 is deformed, separation of the ring member 134 to the communication flow path 123 may be prevented because the ring member 134 is supported by the locking portion 132a.

In the above descriptions, the structure of the flow path blocking valve according to the present invention has been explained. Hereinafter, the operation of the blocking member 135 by movement will be explained with reference to FIGS. 9 to 11.

Figure 9:
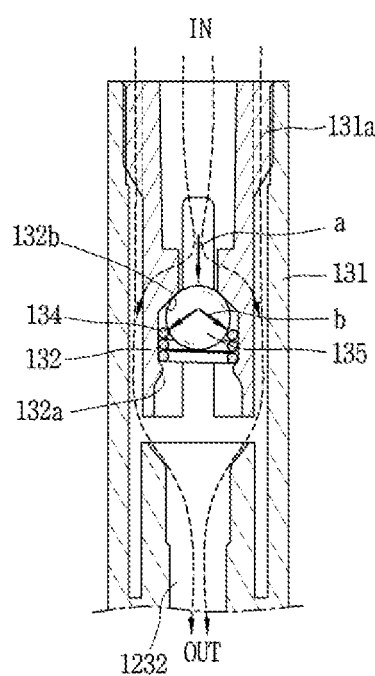
FIGS. 9 to 11 are conceptual views showing each state by a movement of a blocking member.

As shown in FIG. 9, the blocking member 135 positioned in the flow path blocking valve 130 according to the present invention is positioned above the ring member 134, and the ring member 134 is positioned so as to be locked by the locking portion 132a. In this case, gas positioned in the accommodating space 14 moves through the communication flow path 123.

Here, the injection container may have an overpressure state due to thermal, mechanical or chemical reasons during usage or storage, and the temperature of the ring member 134 may be increased. When the temperature is more than a preset level, the diameter of the ring member 134 may be increased, and the cantilever portion 132 contacting the ring member 134 may be also deformed.

Figure 10:
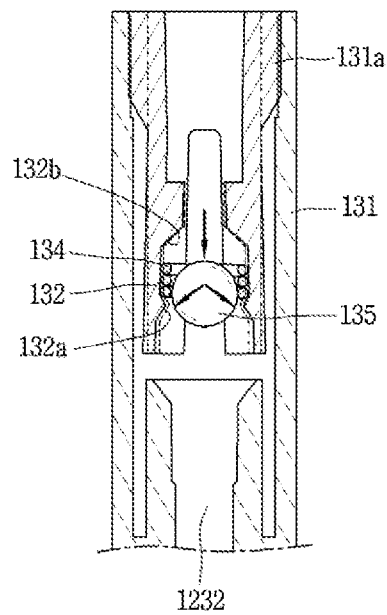
Figure 11:
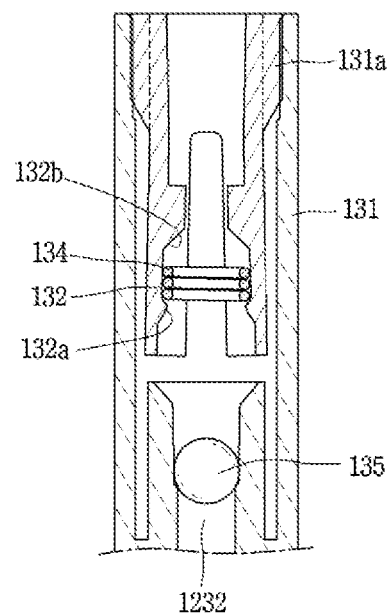

As shown in FIGS. 10 and 11, when the temperature of the ring member 134 is more than a preset level, the blocking member 135 can be deformed to have its diameter increased so as to pass through the central part of the ring member 134. As aforementioned, since the ring member 134 is positioned so as to be supported by the locking portion 134a, falling of the ring member 134 towards the communication flow path 123 may be prevented.

In a case that the ring member 134 is deformed, the blocking member 135 may move towards the inside of the communication flow path 123. More specifically, the blocking member 135 positioned at the upper end of the ring member 134 free-falls in a gravitational direction by passing through the hole formed at the central part of the ring member 134, thereby blocking the communication flow path 123. As a result, the blocking member 135 may block the stem housing 120 so that contents inside the accommodating space 14 of the housing 10 do not leak to the outside.

The cantilever portion 132 is formed of a material which can be plastically deformed when the injection container reaches an overpressure state. Accordingly, as shown in FIG. 10, when the inner temperature of the accommodating space reaches a specific temperature, the cantilever portion 132 is plastically deformed by an external force applied by the ring member 134. As a result, the cantilever portion 132 may be bent in a direction away from the center inside the body 131.

Figure 12:
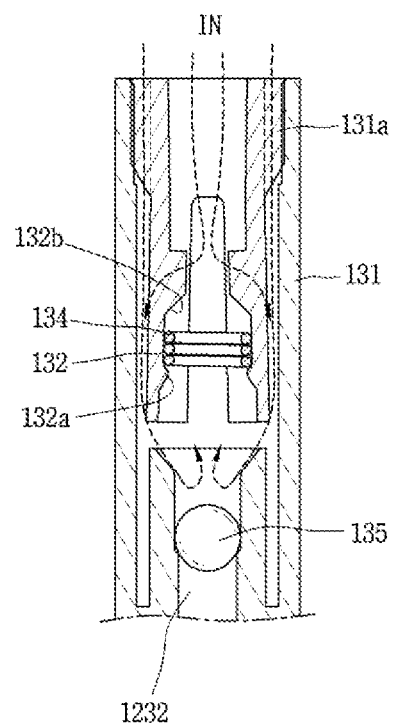
FIG. 12 is a conceptual view showing an inserted state of a flow path blocking valve to a communication flow path.

FIG. 12 is a view showing an inserted state of the flow path blocking valve 130 into the communication flow path 123, which shows an insertion-fitted state of the blocking member 135 into the communication flow path 123.

The flow path blocking valve 130 of the injection container according to the present invention may be positioned to be perpendicular in a lengthwise direction when the injection container is coupled to an injection container accommodating portion of a gas range. Thus, a position of the blocking member 135 accommodated in the accommodating space 14 is supported by the ring member 134.

When the temperature of the accommodating space 14 rises due to an overpressure, and thus when the temperature of the ring member 134 rises above a preset temperature, the ring member 134 is deformed to have its diameter increased. Accordingly, since an external force is applied to the cantilever portion 132, the cantilever portion 132 may be bent.

Here, since the diameter of the central part of the ring member 134 is increased, a locked state of the blocking member 135 to the ring member is released. As a result, the blocking member 135 moves to a gravitational direction, thereby blocking the inside of the communication flow path 123. Thus, contents inside the accommodating space 14 (e.g., gas) cannot flow to the inlet of the communication flow path 123. This may prevent an overpressure state of the inside of the accommodating space.

In the above descriptions, an overpressure relieving mechanism of the flow path blocking valve 130 according to the present invention has been explained. Under this configuration, in the present invention, an explosion of the injection container due to an overpressure of the injection container may be prevented, and gas leakage to the outside may be prevented. This may prevent an explosion probability at an external spot.

In the injection container and the valve assembly thereof according to the present invention, when the temperature inside the injection container rises, the flow path is blocked by the flow path blocking valve. This may relieve an overpressure of the injection container, and may prevent a mal-operation due to an overpressure.

Further the flow path blocking valve 130 is bent as the temperature inside the injection container rises. Accordingly, the flow path of the communication flow path is blocked by the blocking member. This is an advantage to operate a gas blocking mechanism more precisely.

Further, the flow path blocking valve according to the present invention does not leak gas inside the injection container to the outside. This may prevent an explosion or the occurrence of fire.

Figure 13A:
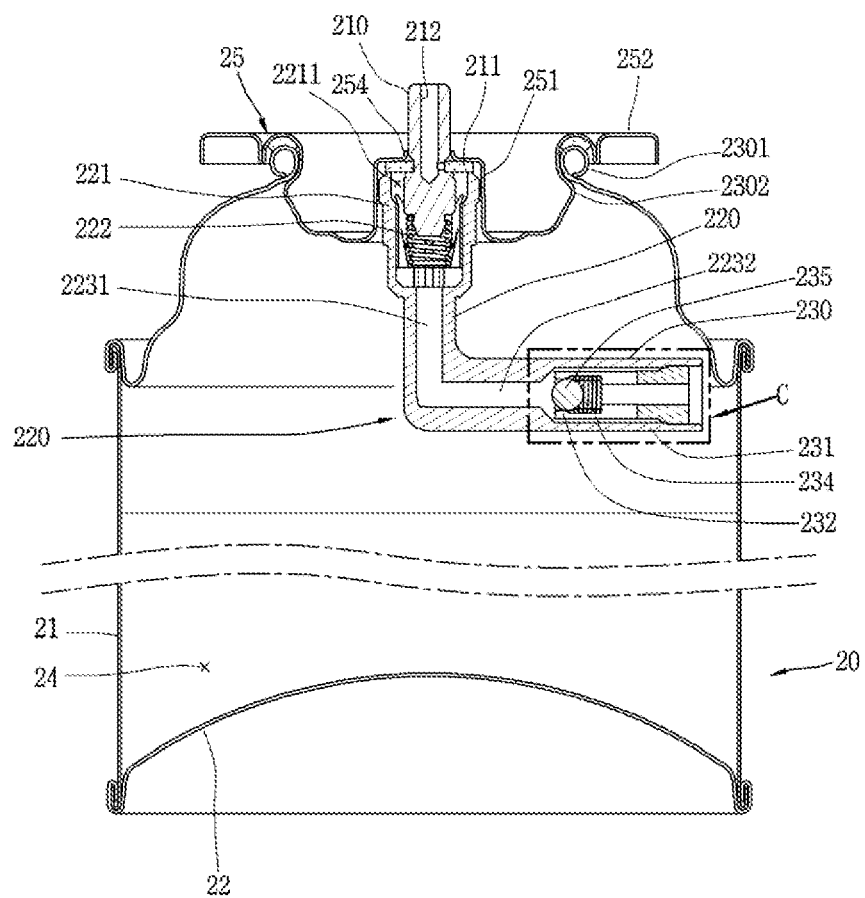
FIG. 13A is a sectional view of an injection container having a valve assembly according to an embodiment of the present invention mounted thereto.

FIG. 13A is a sectional view of an injection container having a valve assembly according to an embodiment of the present invention, mounted thereto. And FIG. 13B is a sectional view of an injection container having a valve assembly according to another embodiment of the present invention, mounted thereto.

Figure 13B:
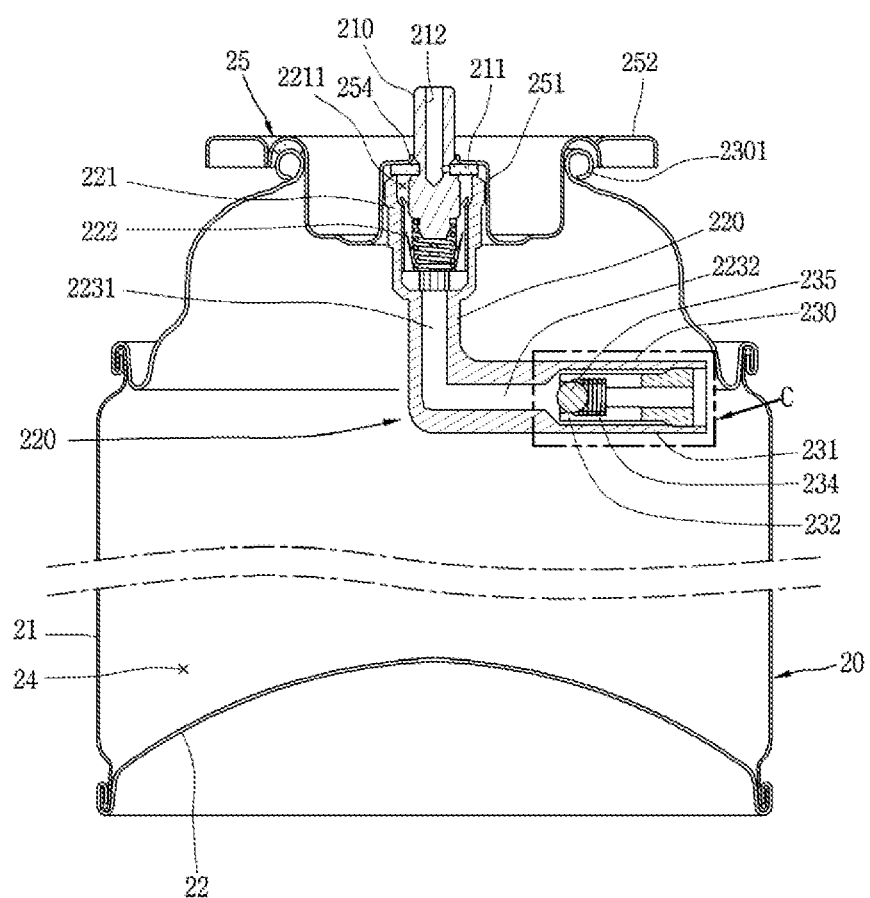
FIG. 13B is a sectional view of an injection container having a valve assembly according to another embodiment of the present invention mounted thereto.

In FIGS. 13A and 13B, an intermediate part of side surfaces of the injection container in a lengthwise direction was deleted by two cutting lines under a judgment that it is unrelated to the features of the present invention and it is unnecessary in explaining the present invention. However, a part of the side surfaces of the injection container was deleted between the two cutting lines. Actually, the respective side surfaces of the injection container are extended in upper and lower directions, thereby being connected to each other.

Referring to FIG. 13A, a housing 20 of a cylindrical shape is provided with an accommodating space 24 therein, and is configured to accommodate therein contents such as fluid or gas and spraying gas.

The housing 20 includes a body 21 having the accommodating space 24, and a lower sealing cap 22 and an upper sealing cap 23 for sealing both ends of the body 21, respectively. The lower sealing cap 22 may be formed in a shape bent towards the accommodating space 24. According to this, when an overpressure more than a preset level is applied to the accommodating space 24, the lower sealing cap 22 may be deformed to increase a volume of the accommodating space 24.

The upper sealing cap 23 may be coupled to the body 21 so as to seal an upper part of the body 21. The upper sealing cap 23 may form a seaming coupling portion 2301 so as to be coupled with the mounting cup 25 in a bent or rolled manner. The seaming coupling portion is formed along the edge of the mounting cup 25. The body 21 may be coupled to a lower end of the upper sealing cap 23 in a neck-in type. In this case, the body 21 may be formed to be extended in a straight line in a lengthwise direction.

The housing 20 may contain gas of a high pressure or fuel of a liquid state, and may be configured in the form of a metallic can which is capable of enduring a predetermined inner pressure. However, the present invention is not limited to this. The housing 20 may contain a pesticide, an aromatic, a beauty care product, etc.

Referring to FIG. 13A, the mounting cup 25 for supporting a valve assembly 200 is coupled to an upper end of the upper sealing cap 23.

The mounting cup 25 includes a locking shape portion 252 so as to be mounted to a fuel mounting device such as a gas range. And a protruding part 251 for fixing the valve assembly 200 is provided at an intermediate part of the mounting cup 25. However, in some cases, the locking shape portion 252 may not be provided, or may be configured in another form. For instance, as another form of the locking shape portion 252, in a case that a beauty care product, a pesticide, etc. are contained in the housing 20, a cap having a pressing button for injection may be mounted.

The mounting cup 25 is formed as a locking protrusion 2302 protrudes from a lower end of the seaming coupling portion 2301 of the upper sealing cap 23. The locking protrusion 2302 may be formed as the mounting cup 25 is assembled in a clamped manner when the mounting cup 25 is coupled to an injection container accommodating portion of a gas range.

Referring to FIG. 13B, in the injection container according to another embodiment of the present invention, a lower end of the upper sealing cap 23 may be coupled to the body 21 in a neck-out type. In the following descriptions, for convenience, an operation method of the valve assembly 200 will be explained on the basis of the injection container of FIG. 13A. However, the present invention is not limited to this, and it will be obvious to those skilled in the art that the present invention may be applicable to the injection container of FIG. 13B.

Figure 14:
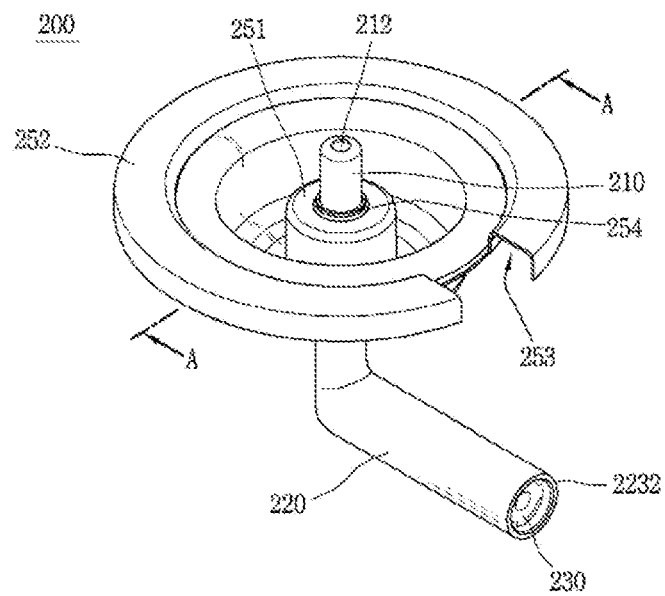
FIG. 14 is a perspective view showing a mounted state of a valve assembly to a mounting cup of FIG. 13.
Figure 15:
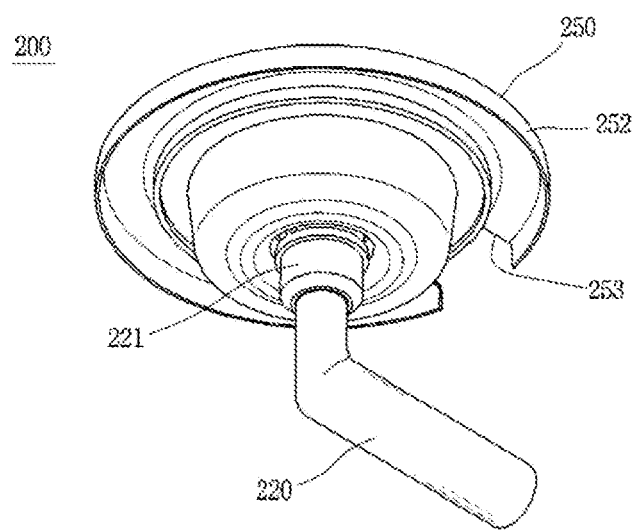
FIG. 15 is a bottom perspective view of the valve assembly of FIG. 14, which is viewed from the lower side.
Figure 16:
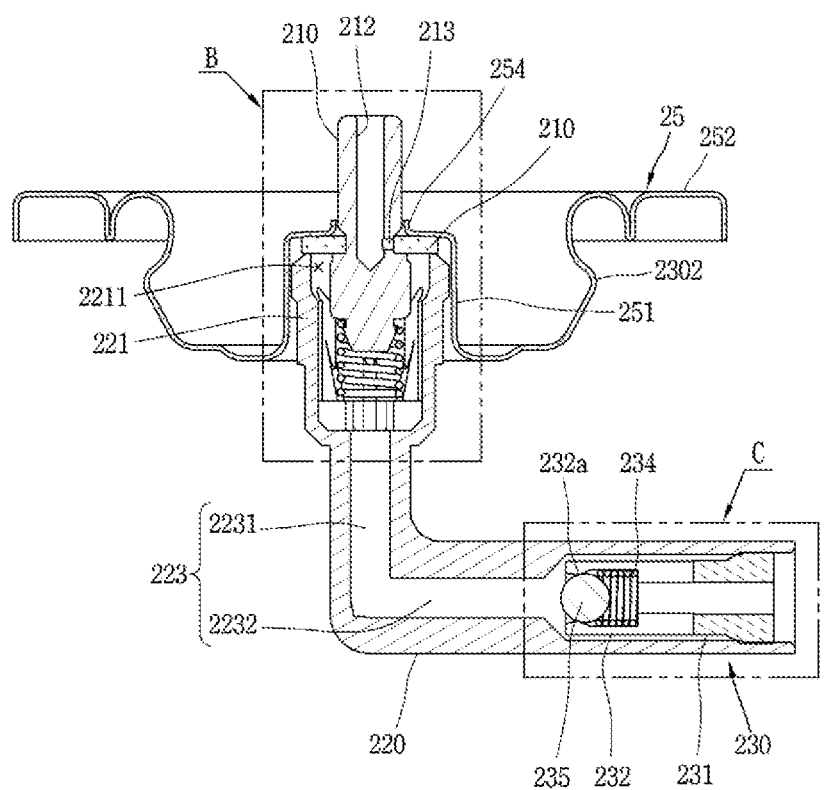
FIG. 16 is a sectional view taken along line 'A-A' in FIG. 14.
Figure 17:
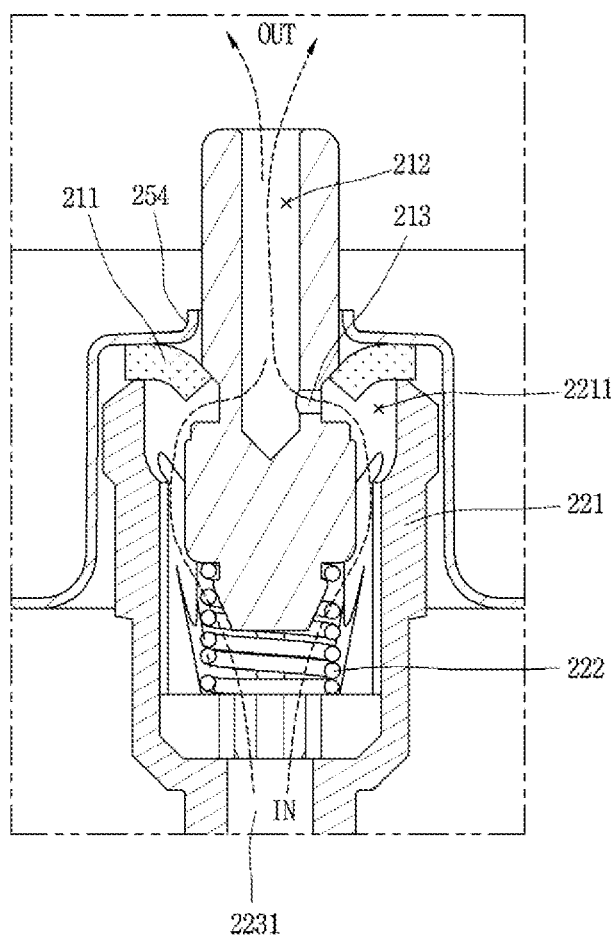
FIG. 17 is an enlarged view of 'B' in FIG. 16.

FIG. 14 is a perspective view showing a mounted state of the valve assembly 200 to the mounting cup 25 of FIG. 13. FIG. 15 is a bottom perspective view of the valve assembly 200 of FIG. 14, which is viewed from the lower side. FIG. 16 is a sectional view taken along line 'A-A' in FIG. 14. And FIG. 17 is an enlarged view of 'B' in FIG. 16.

Referring to FIG. 14, the mounting cup 25 is provided with a notch groove 253 formed at one side of the locking shape portion 252, so as to be mounted to a gas range (or an external device for mounting the injection container). In a case that the injection container is mounted to an injection container accommodating portion of a gas range, the notch groove 253 is arranged so as to be towards an upper direction of the injection container accommodating portion.

The valve assembly 200 includes a valve stem 210 for injecting contents contained in the accommodating space 24 to the outside by being pressurized, and a stem housing 220.

A through hole 254 is formed at a central part of an upper end of the protruding part 251 of the mounting cup 25.

An opening/closing member 211 of a ring shape is mounted to an inner side surface of the upper end of the protruding part 251 of the mounting cup 25, so as to cover a part of the through hole 254.

The valve stem 210 is mounted to the upper end of the protruding part 251 of the mounting cup 25, so as to be slidable in upper and lower directions by the opening/closing member 211. An upper part of the valve stem 210 is exposed to the outside of the housing 20 by passing through a central hole of the opening/closing member 211 and the through hole 254. A lower part of the valve stem 210 is arranged to be accommodated in the upper end of the protruding part 251 of the mounting cup 25. A coupling groove is formed on a side surface of the valve stem 210 in a circumferential direction, and an inner circumferential part of the opening/closing member 211 is inserted into the coupling groove. And the valve stem 210 may be supported so as to be slidable in upper and lower directions by the opening/closing member 211.

An air discharge hole 212 is formed at an upper end of the valve stem 210 in a directly downward direction, and an orifice 213 is formed between a lower end of the air discharge hole 212 and the coupling groove. And the air discharge hole 212 may be communicated with the accommodating space 24 of the housing 20 through the orifice 213. Here, the opening/closing member 211 encloses the coupling groove of the valve stem 210, and may selectively open and close the orifice 213 by sliding of the valve stem 210.

The stem housing 220 includes a mounting portion 221 having a hollow portion 2211 therein, and a communication flow path 223 for communicating the hollow portion 2211 with the accommodating space 24 of the housing 20. The hollow portion 2211 may be selectively communicated with the air discharge hole 212 through the orifice 213.

A part of the mounting portion 221 is accommodated in the protruding part 251 of the mounting cup 25, and the mounting portion 221 is provided with a hollow portion 2211 therein. Under the configuration, a lower part of the valve stem 210 is arranged at the hollow portion 2211 so as to be slidable. Here, an upper end of the mounting portion 221 is configured to support an outer circumferential part of the opening/closing member 211.

A valve spring 222 is provided in the mounting portion 221, and the valve spring 222 is configured to elastically support the lower part of the valve stem 210.

A communication flow path 223 is provided in the stem housing 220, and the hollow portion 2211 is communicated with the accommodating space 24 of the housing 20 through the communication flow path 223.

The communication flow path 223 may be configured to include a first communication flow path portion 2231 extended in the same or similar direction as/to a lengthwise direction of the housing 20 or a sliding direction of the valve stem 210, and a second communication flow path portion 2232 extended from the first communication flow path portion 2231 in a side direction of the housing 20. The second communication flow path portion 2232 may be extended in a direction to cross a side surface of the housing 20. An upper end of the first communication flow path portion 2231 may be communicated with the hollow portion 2211, and an end part of the second communication flow path portion 2232 may be communicated with the accommodating space 24 by being arranged to be spaced from the upper sealing cap 23.

A gas discharge operation of the valve assembly 200 will be explained with reference to FIG. 17.

When the injection container is mounted to an injection container accommodating portion of a gas range (or an external device) in a lying manner horizontally, the notch groove 253 of the mounting cup 25 is arranged towards an upper direction of the injection container accommodating portion, and the second communication flow path portion 2232 of the stem housing 220 is also arranged towards the upper direction.

In case of an injection container using liquid fuel, liquid fuel may sink in a gravitational direction while it is being used. And gas fuel evaporated to an upper space of the accommodating space 24 on the basis of a virtual lengthwise central line of the housing 20 may be introduced into the hollow portion 2211 through the second communication flow path portion 2232 and the first communication flow path portion 2231.

The valve stem 210 may be pressurized in a lengthwise direction of the housing 20. By the pressurization, the valve spring 222 is compressed and the valve stem 210 is slid towards the accommodating space 24. An inner circumferential part of the opening/closing member 211 is pushed to the accommodating space 24 by the sliding of the valve stem 210. Accordingly, the orifice 213 is opened, so that the gas fuel in the accommodating space 24 may be outwardly injected through the valve stem 210 at the hollow portion 2211 of the stem housing 220. When the pressurization is released, the injection of the contents may be stopped.

The valve assembly 200 of the present invention may further include a flow path blocking valve 230 formed to block an inlet of the communication flow path of the stem housing, in order to relieve an overpressure state of the accommodating space 24. Hereinafter, the flow path blocking valve will be explained in more detail with reference to FIGS. 18 to 20.

Figure 18:
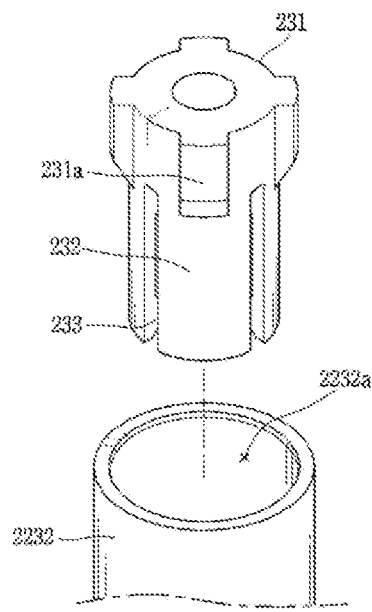
FIG. 18 is a conceptual view of a flow path blocking valve according to the present invention.
Figure 19:
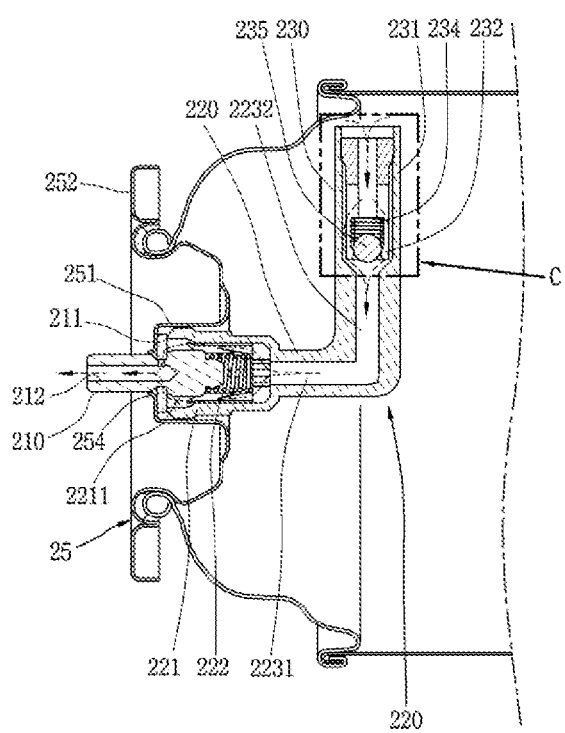
FIG. 19 is a conceptual view showing a mounted state of an injection container according to the present invention to an injection container accommodating portion of a gas range.
Figure 20:
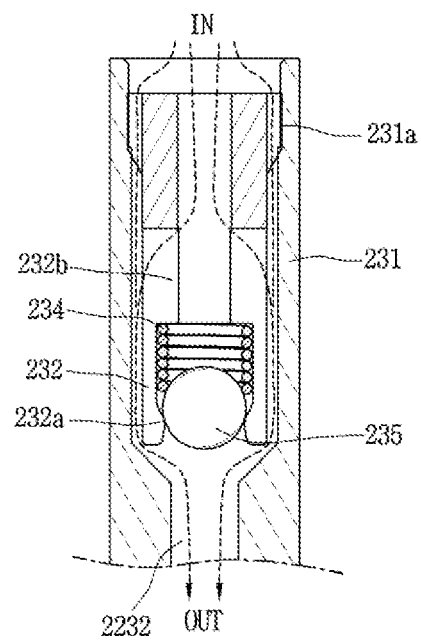
FIG. 20 is an enlarged view of 'C' in FIG. 19.

FIG. 18 is a perspective view of the flow path blocking valve according to the present invention. FIG. 19 is a conceptual view of an injection container having the flow path blocking valve mounted thereto. And FIG. 20 is an enlarged view of 'C' in FIG. 19.

Referring to FIGS. 13 to 16, the flow path blocking valve 230 may be inserted into the valve assembly 200, in order to prevent an overpressure state inside the accommodating space 24.

Referring to FIG. 18, the flow path blocking valve 230 may be formed to be inserted into the communication flow path 223 of the stem housing 220 in parallel, and thereby to selectively block a point of a passage where gas inside the accommodating space 24 is discharged to the outside.

Here, the insertion part of the flow path blocking valve 230 to the communication flow path 223 may be a part of the second communication flow path 2232 which is arranged in a gravitational direction, for movement of a blocking member 235 in a gravitational direction by release of a locked state when the injection container is mounted to an external device.

Specifically, as shown in FIG. 19, when the injection container is mounted to an injection container accommodating portion of a gas range (or an external device) in a lying manner horizontally, the flow path blocking valve 230 is arranged so that the notch groove 253 of the mounting cup 25 is towards an upper direction of the injection container accommodating portion, and the second communication flow path portion 2232 of the stem housing 220 is also towards the upper direction. Here, the flow path blocking valve 230 may be inserted into a hollow portion 2232a (refer to FIG. 18) of the second communication flow path portion 2232 which is arranged towards an upper direction (that is, a gravitational direction). Thus, the flow path blocking valve 230 is arranged in a gravitational direction, and the blocking member 235 disposed in the flow path blocking valve 230 may be moved by gravity towards the inlet when a locked state is released.

Hereinafter, the flow path blocking valve 230 will be explained in more detail. Referring to FIGS. 18 to 20, the flow path blocking valve 230 according to the present invention may include a body 231, a blocking member 235, and a spring 234.

The body 231 is formed to have a cylindrical shape, and may be inserted into the communication flow path 223. The body 231 may be provided with a hollow portion therein so that contents inside the accommodating space 24 are discharged to the outside of the housing 20 through the flow path blocking valve 230.

A plurality of protrusions 231a may be formed on an outer circumferential surface of the body 231 at positions spaced from each other, so as to be fitted into the communication flow path 223. The plurality of protrusions 231a may fix a position when the flow path blocking valve 230 is inserted into the communication flow path 223. Thus, the plurality of protrusions 231a may be installed to contact an inner circumferential surface of the communication flow path 223. Contents inside the accommodating space 24 may be moved to the communication flow path 223 of the stem housing 220, through a space between the plurality of protrusions 231a.

The body 231 may be provided with a plurality of grooves 233 arranged in a circumferential direction along an outer circumferential surface in a spaced manner, and formed concavely in a radial direction; and at least one cantilever portion 232 formed in a cantilever shape. The groove 233 and the cantilever portion 232 may be extended in a lengthwise direction of the body 231.

The cantilever portion 232 may be formed of a plastically deformable material. That is, the cantilever portion 232 may be formed of a material which can be bent or curved by heat. For instance, the cantilever portion 232 may be formed of a thermoplastic material, such as poly-oxy-methylene (POM), polyethylene (PE), polypropylene (PP), polystylene (PS), polyvinychloride (PVC), acrylonitrile butadien styrene resin (ABS resin), polyamide (PA), polycarbonate (PC), polyphenylesulfied (PPS), polyetheretherketone (PEEK), and polytetrafluoroethylene (PTFE).

The cantilever portion 232 may be provided with a locking portion 232a, in order to lock a movement of the blocking member 235 accommodated in the body 231 in one direction. The one direction may be a gravitational direction.

The locking portion 232a may have a shape protruding from the cantilever portion 232. For instance, the locking portion 232a may have a bent shape that a part of an inner circumferential surface of the cantilever portion 232 is towards the center inside the body 231. Alternatively, the locking portion 232a may have a shape protruding from the end of the cantilever portion 232 adjacent to the inlet of the communication flow path 223 when the flow path blocking valve 230 is inserted into the communication flow path 223. Thus, the locking portion 232a may restrict the blocking member 235 from moving towards the inlet of the communication flow path 223.

The locking portion 232a may be protruded in a round shape in a bent manner so that the blocking member 235 moves flexibly. The locking portion 232a may be protruded in various shapes including a trapezoidal shape, a triangular shape, etc. as well as a rounded shape.

The blocking member 235 is accommodated in the body 231, and may be formed to be moveable in the body. The blocking member 235 may be a ball of a spherical shape or a steel ball. However, it is obvious to those skilled in the art that the blocking member 235 may be formed to have a polyhedral shape which can block the inlet of the communication flow path, as well as the spherical shape.

The blocking member 235 may be formed to have a diameter larger than a diameter of the inlet of the communication flow path 223, so that the blocking member 235 blocks the inlet of the communication flow path 223 without moving into the communication flow path 223. Thus, the blocking member 235 may block the inlet of the communication flow path 223. And the diameter of the blocking member 235 may have a predetermined size so that the blocking member 235 is locked by the locking portion 232a.

The blocking member 235 may be restricted from moving into the body, by being locked by the locking portion 232a formed at the cantilever portion 232. Since the blocking member 235 does not reach the inlet of the communication flow path 223 by being locked, the inlet of the communication flow path 223 is opened. Thus, gas of the accommodating space 24 flows to the communication flow path 223.

The spring 234 is arranged in the body, and may be formed to apply an external force (i.e., an elastic force) to the blocking member 235 in one direction. A supporting portion 232b for fixing a position of the spring 234 so that the spring 234 expands in one direction may be further provided on an inner circumferential surface of the body 231.

The supporting portion 232b may be formed to fix one end of both ends of the spring 234. One end of the spring 234 may be fixed to the supporting portion 232b by a contact material. Thus, the spring 234 may have an elastic force in a direction from its one end fixed to the supporting portion 232b to its another end.

The supporting portion 232b is arranged to be spaced from the locking portion 232a so that the blocking member 235 and the spring 234 are positioned at a space between the locking portion 232a and the supporting portion 232b. And the supporting portion 232b may be formed so that the inner circumferential surface of the body 231 protrudes towards the center of the body 231. Here, the supporting portion 232b may be formed not to block the hollow portion of the body for movement of contents inside the accommodating space.

Another end of the spring 234, not one end of the spring 234 fixed to the supporting portion 232b, contacts the blocking member 235. The spring 234 may apply an external force of one direction, to the blocking member 235, in a compressed state. The one direction, an expansion direction of the spring 234 is a direction of the supporting portion 232b towards the locking portion 232a. The blocking member 235 may apply an external force to the locking portion 232a by a force applied thereto 235.

In the above descriptions, the structure of the flow path blocking valve according to the present invention has been explained. Hereinafter, a moving operation of the blocking member of the flow path blocking valve according to the present invention will be explained with reference to FIGS. 21 to 23.

The injection container according to the present invention may have an overpressure state due to thermal, mechanical or chemical reasons during usage or storage. In this case, the flow path blocking valve 230 may block the stem housing 220 so that contents inside the accommodating space 24 of the housing 20 may not leak to the outside.

Figure 21:
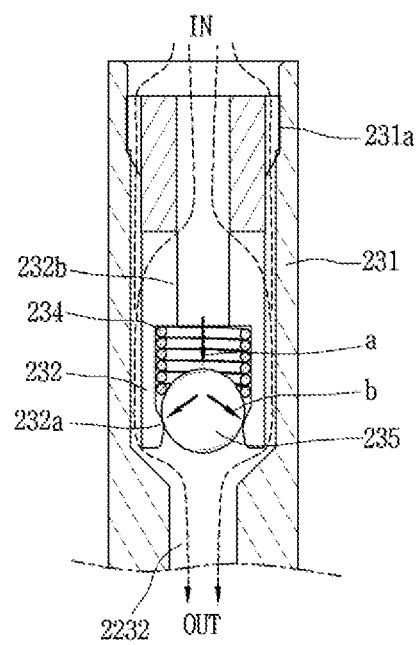
FIGS. 21 to 25 are conceptual views showing an overpressure relieving mechanism according to the present invention.

More specifically, referring to FIG. 21, the blocking member 235 accommodated in the flow path blocking valve 230 according to the present invention may continuously receive an elastic force (a) of one direction by the spring 234. The blocking member 235 may be moved to the one direction by the elastic force (a). However, since the movement of the blocking member 235 is locked by the locking portion 232a, the locking portion 232a applies an external force (b) to a direction away from the center inside the body 231.

The locking portion 232a is not plastically deformed at a temperature below a specific temperature. Thus, the locking portion 232a is not bent or widened by the external force (b) at a temperature below a specific temperature. Therefore, the movement of the blocking member 235 may be restricted at a temperature below a specific temperature.

Figure 22:
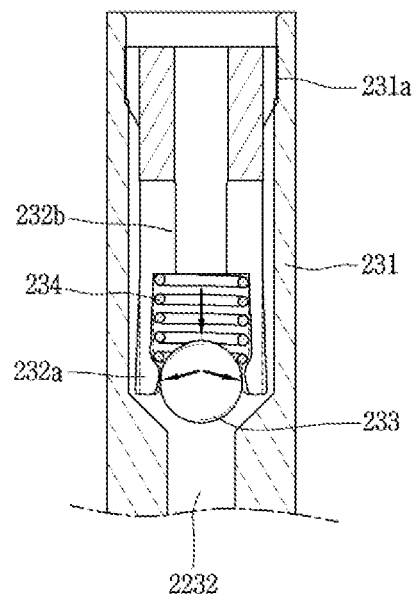

The cantilever portion 232 is formed of a material which can be deformed plastically when the injection container reaches an overpressure state. Referring to FIG. 22, when the temperature inside the accommodating space reaches a specific temperature, the cantilever portion 232 may be deformed plastically by the external force (b) applied by the blocking member 235. Specifically, the cantilever portion 232 may be bent in a direction away from the center inside the body 231.

Figure 23:
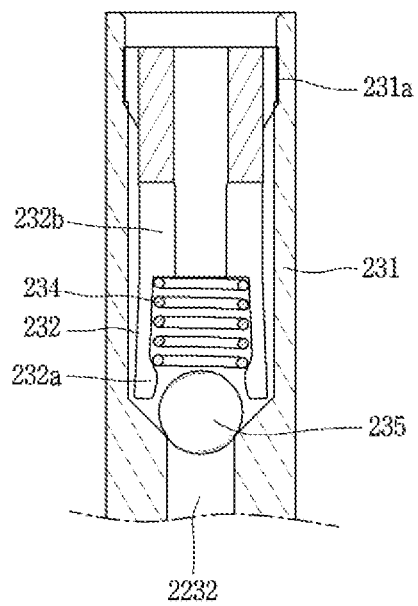

As shown in FIGS. 22 and 23, when the locked state is released due to the bending of the cantilever portion 232, the blocking member 235 may move to a direction that the elastic force (a) is applied. Thus, the blocking member 235 reaches the inlet of the communication flow path 223, and thereby the inlet of the communication flow path 223 is blocked.

In the above descriptions, the moving operation of the blocking member of the flow path blocking valve 230 according to the present invention has been explained. Hereinafter, an overpressure relieving mechanism of the flow path blocking valve 230 according to the present invention will be explained with reference to FIGS. 24 and 25.

Figure 24:
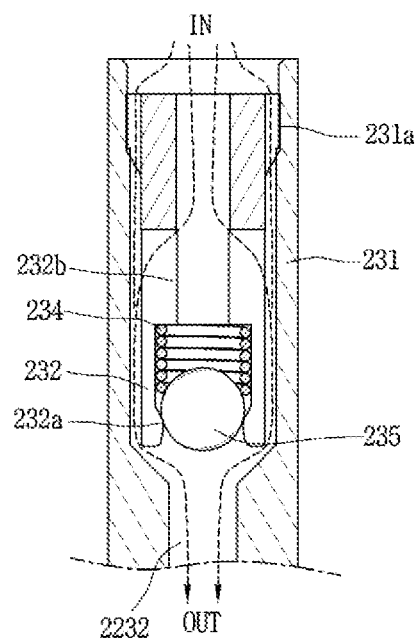
Figure 25:
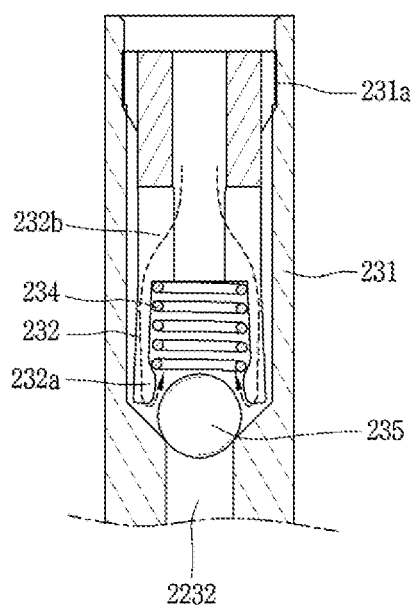

FIGS. 24 and 25 are conceptual views showing an inserted state of the flow path blocking valve 230 into the communication flow path 223.

Referring to FIG. 24, the flow path blocking valve 230 of the injection container according to the present invention may be positioned vertically in a lengthwise direction when the injection container is coupled to an injection container accommodating portion of a gas range in a vertical manner. Thus, the blocking member 235 accommodated in the accommodating space 24 receives an external force and a gravitational force at the same time by the spring 234.

The blocking member 235 may have its movement locked by the locking portion 232a of the cantilever portion 232, in a direction that an elastic force and a gravitational force are applied. As aforementioned with reference to FIGS. 21 to 23, the blocking member 235 may apply an external force to the locking portion 232a such that the cantilever portion 232 is bent.

The cantilever portion 232 is formed of a material which does not change a shape by an external force at a temperature below a specific temperature. Accordingly, the cantilever portion 232 is not bent or curved, even if an external force is applied by the blocking member 235. Thus, as shown in FIG. 24, contents (e.g., gas) inside the accommodating space 24 may flow to the inlet of the communication flow path 223, by passing through the flow path blocking valve 230.

In a case that the temperature of the accommodating space 24 rises due to an overpressure and thereby the temperature of the cantilever portion 232 rises above a specific temperature, the cantilever portion 232 is in a state which can be deformed by heat. In this case, as shown in FIG. 25, the cantilever portion 232 may be bent by an external force applied by the blocking member 235. If the cantilever portion 232 is bent, the blocking member 235 has its locked state released and moves to a direction to which an elastic force and a gravitational force are applied. In this case, the inlet of the communication flow path 223 is blocked by the blocking member 235. Thus, contents (e.g., gas) inside the accommodating space 24 cannot flow to the inlet of the communication flow path 223.

In the above descriptions, an overpressure relieving mechanism by the flow path blocking valve according to the present invention has been explained. Under the configuration, in the present invention, an explosion of the injection container due to an overpressure of the injection container can be prevented. Further, since gas leakage to the outside is prevented, an explosion probability at an external spot can be prevented.

In the injection container and the valve assembly thereof according to the present invention, if an inner temperature of the injection container rises, the flow path is blocked by the flow path blocking valve. This can solve an overpressure of the injection container, and thereby can prevent a malfunction due to an overpressure.

Further, the flow path blocking valve 200 of the present invention is bent as the inner temperature of the injection container rises. Accordingly, the flow path of the communication flow path is blocked by the blocking member. This can operate a gas blocking mechanism more precisely. Further, since the flow path blocking valve of the present invention does not discharge gas inside the injection container to the outside, an explosion or the occurrence of fire can be prevented.

Figure 26A:
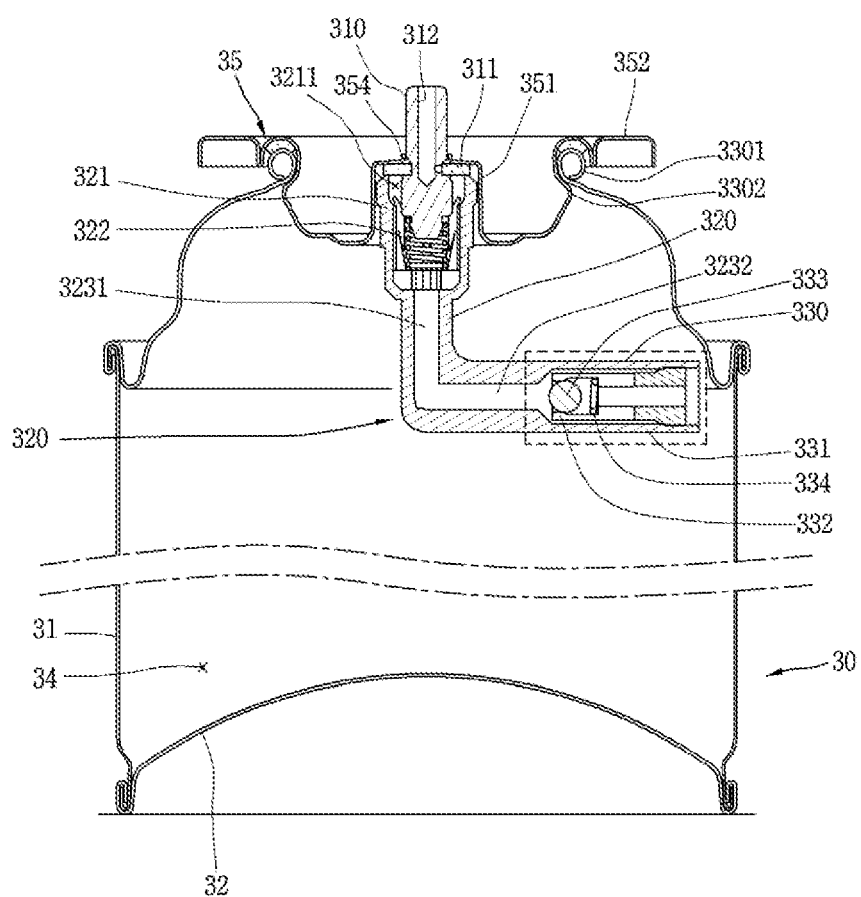
FIG. 26A is a sectional view of an injection container having a valve assembly according to one embodiment of the present invention mounted thereto.

FIG. 26A is a sectional view of an injection container having a valve assembly according to one embodiment of the present invention, mounted thereto. And FIG. 26B is a sectional view of an injection container having a valve assembly according to another embodiment of the present invention, mounted thereto.

Figure 26B:
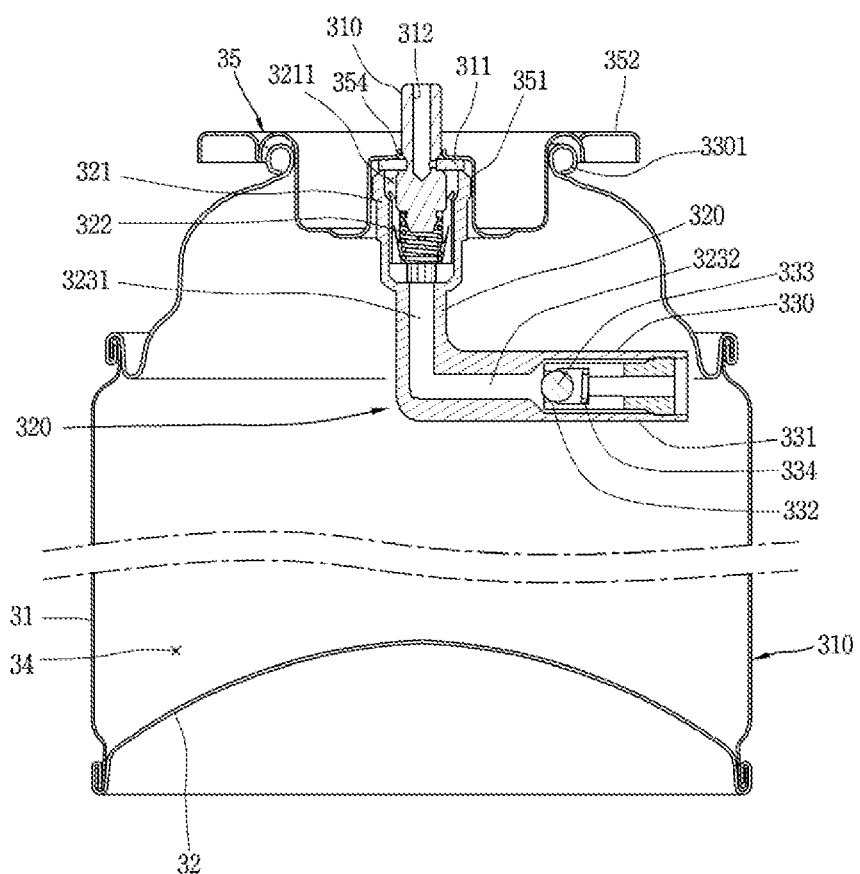
FIG. 26B is a sectional view of an injection container having a valve assembly according to another embodiment of the present invention mounted thereto.

In FIGS. 26A and 26B, an intermediate part of the injection container in a lengthwise direction was deleted by two cutting lines under a judgment that it is unrelated to the features of the present invention and it is unnecessary in explaining the present invention. However, a part of side surfaces of the injection container was deleted between the two cutting lines. Actually, the respective side surfaces of the injection container are connected to each other by being extended in upper and lower directions.

Referring to FIG. 26A, a housing 30 of a cylindrical shape is provided with an accommodating space 34 therein, and is configured to accommodate therein contents such as fluid or gas and spraying gas.

The housing 30 includes a body 31 having the accommodating space 34, and a lower sealing cap 32 and an upper sealing cap 33 for sealing both ends of the body 31, respectively. The lower sealing cap 32 may be formed in a shape bent towards the accommodating space 34. According to this, when an overpressure more than a preset level is applied to the accommodating space 34, the lower sealing cap 32 may be deformed to increase a volume of the accommodating space 34.

The upper sealing cap 33 may be coupled to the body 31 so as to seal an upper part of the body 31. The upper sealing cap 33 may form a seaming coupling portion 3301 so as to be coupled with the mounting cup 35 in a bent or rolled manner. The seaming coupling portion is formed along the edge of the mounting cup 35. The body 31 may be coupled to a lower end of the upper sealing cap 33 in a neck-in type. In this case, the body 31 may be formed to be extended in a straight line in a lengthwise direction.

The housing 30 may contain gas of a high pressure or fuel of a liquid state, and may be configured in the form of a metallic can which is capable of enduring a predetermined inner pressure. However, the present invention is not limited to this. The housing 30 may contain a pesticide, an aromatic, a beauty care product, etc.

Referring to FIG. 26A, the mounting cup 35 for supporting a valve assembly 300 is coupled to an upper end of the upper sealing cap 33.

The mounting cup 35 includes a locking shape portion 352 so as to be mounted to a fuel mounting device such as a gas range. And a protruding part 351 for fixing the valve assembly 300 is provided at an intermediate part of the mounting cup 35. However, in some cases, the locking shape portion 352 may not be provided, or may be configured in another form. For instance, as another form of the locking shape portion 352, in a case that a beauty care product, a pesticide, etc. are contained in the housing 30, a cap having a pressing button for injection may be mounted.

The mounting cup 35 is formed as a locking protrusion 3302 protrudes from a lower end of the seaming coupling portion 3301 of the upper sealing cap 33. The locking protrusion 3302 may be formed as the mounting cup 35 is assembled in a clamped manner when the mounting cup 35 is coupled to an injection container accommodating portion of a gas range.

Referring to FIG. 26B, in the injection container according to another embodiment of the present invention, a lower end of the upper sealing cap 33 may be coupled to the body 31 in a neck-out type. In the following descriptions, for convenience, an operation method of the valve assembly 300 will be explained on the basis of the injection container of FIG. 26A. However, the present invention is not limited to this, and it will be obvious to those skilled in the art that the present invention may be applicable to the injection container of FIG. 26B.

Figure 27:
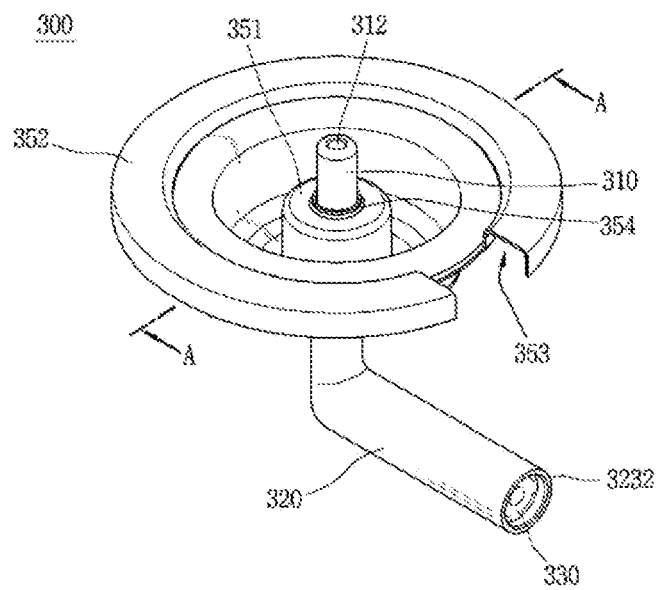
FIG. 27 is a perspective view showing a mounted state of a valve assembly to a mounting cup of FIGS. 26A and 26B.
Figure 28:
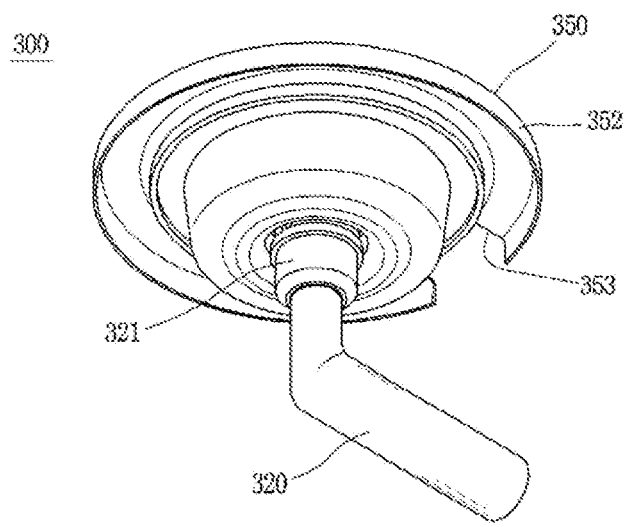
FIG. 28 is a bottom perspective view of the valve assembly of FIG. 27, which is viewed from the lower side.
Figure 29:
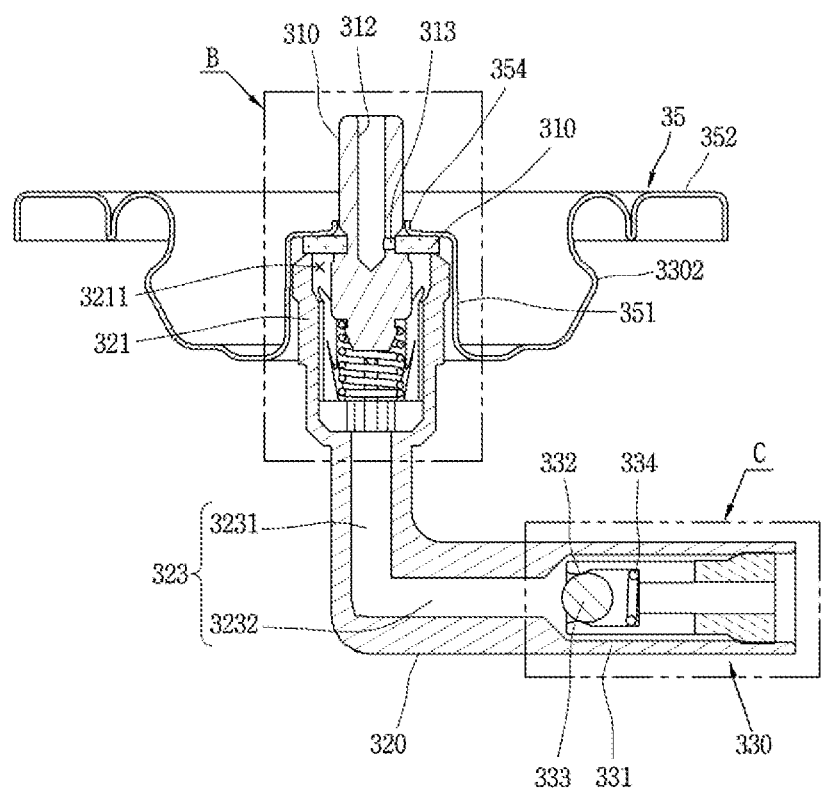
FIG. 29 is a sectional view taken along line 'A-A' in FIG. 27.
Figure 30:
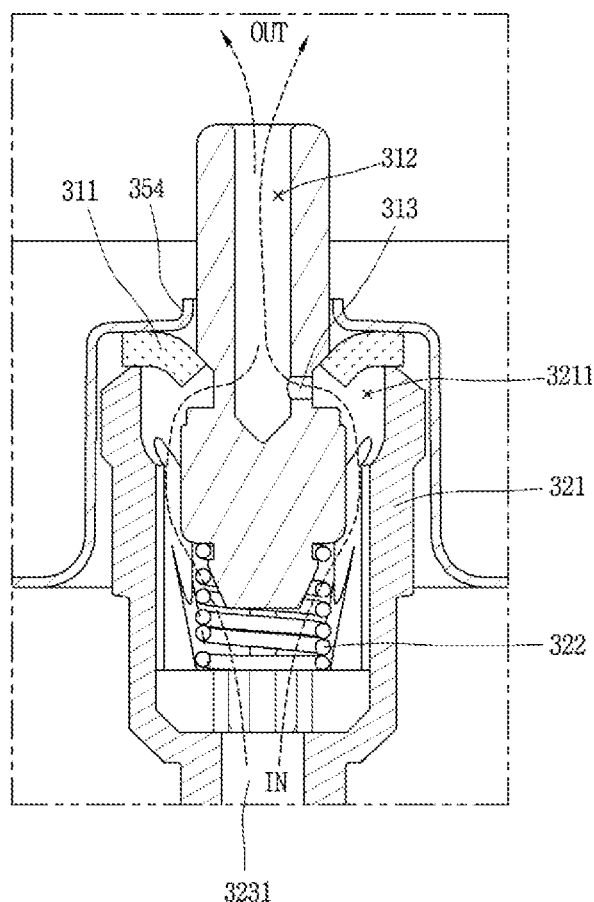
FIG. 30 is an enlarged view of 'B' in FIG. 29.

FIG. 27 is a perspective view showing a mounted state of the valve assembly 300 to the mounting cup 35 of FIG. 26. FIG. 28 is a bottom perspective view of the valve assembly 300 of FIG. 27, which is viewed from the lower side. FIG. 29 is a sectional view taken along line 'A-A' in FIG. 27. And FIG. 30 is an enlarged view of 'B' in FIG. 29.

Referring to FIG. 27, the mounting cup 35 is provided with a notch groove 353 formed at one side of the locking shape portion 352, so as to be mounted to a gas range (or an external device for mounting the injection container). In a case that the injection container is mounted to an injection container accommodating portion of a gas range, the notch groove 353 is arranged so as to be towards an upper direction of the injection container accommodating portion.

The valve assembly 300 includes a valve stem 310 for injecting contents contained in the accommodating space 34 to the outside by being pressurized, and a stem housing 320.

A through hole 354 is formed at a central part of an upper end of the protruding part 351 of the mounting cup 35.

An opening/closing member 311 of a ring shape is mounted to an inner side surface of the upper end of the protruding part 351 of the mounting cup 35, so as to cover a part of the through hole 354.

The valve stem 310 is mounted to the upper end of the protruding part 351 of the mounting cup 35, so as to be slidable in upper and lower directions by the opening/closing member 311. An upper part of the valve stem 310 is exposed to the outside of the housing 30 by passing through a central hole of the opening/closing member 311 and the through hole 354. A lower part of the valve stem 310 is arranged to be accommodated in the upper end of the protruding part 351 of the mounting cup 35. A coupling groove is formed on a side surface of the valve stem 310 in a circumferential direction, and an inner circumferential part of the opening/closing member 311 is inserted into the coupling groove. And the valve stem 310 may be supported so as to be slidable in upper and lower directions by the opening/closing member 311.

An air discharge hole 312 is formed at an upper end of the valve stem 310 in a directly downward direction, and an orifice 313 is formed between a lower end of the air discharge hole 312 and the coupling groove. And the air discharge hole 312 may be communicated with the accommodating space 34 of the housing 30 through the orifice 313. Here, the opening/closing member 311 encloses the coupling groove of the valve stem 310, and may selectively open and close the orifice 313 by sliding of the valve stem 310.

The stem housing 320 includes a mounting portion 321 having a hollow portion 3211 therein, and a communication flow path 323 for communicating the hollow portion 3211 with the accommodating space 34 of the housing 30. The hollow portion 3211 may be selectively communicated with the air discharge hole 312 through the orifice 313.

A part of the mounting portion 321 is accommodated in the protruding part 351 of the mounting cup 35, and the mounting portion 321 is provided with a hollow portion 3211 therein. Under the configuration, a lower part of the valve stem 310 is arranged at the hollow portion 3211 so as to be slidable. Here, an upper end of the mounting portion 321 is configured to support an outer circumferential part of the opening/closing member 311.

A valve spring 322 is provided in the mounting portion 321, and the valve spring 322 is configured to elastically support the lower part of the valve stem 310.

A communication flow path 323 is provided in the stem housing 320, and the hollow portion 3211 is communicated with the accommodating space 34 of the housing 30 through the communication flow path 323.

The communication flow path 323 may be configured to have a first communication flow path portion 3231 extended in the same or similar direction as/to a lengthwise direction of the housing 30 or a sliding direction of the valve stem 310, and a second communication flow path portion 3232 extended from the first communication flow path portion 3231 in a side direction of the housing 30. The second communication flow path portion 3232 may be extended in a direction to cross a side surface of the housing 30. An upper end of the first communication flow path portion 3231 may be communicated with the hollow portion 3211, and an end part of the second communication flow path portion 3232 may be communicated with the accommodating space 34 by being arranged to be spaced from the upper sealing cap 33.

A gas discharge operation of the valve assembly 300 will be explained with reference to FIG. 30.

When the injection container is mounted to an injection container accommodating portion of a gas range (or an external device) in a lying manner horizontally, the notch groove 353 of the mounting cup 35 is arranged towards an upper direction of the injection container accommodating portion, and the second communication flow path portion 3232 of the stem housing 320 is also arranged towards the upper direction.

In case of an injection container using liquid fuel, liquid fuel may sink in a gravitational direction while it is being used. And gas fuel evaporated to an upper space of the accommodating space 34 on the basis of a virtual lengthwise central line of the housing 30 may be introduced into the hollow portion 3211 through the second communication flow path portion 3232 and the first communication flow path portion 3231.

The valve stem 310 may be pressurized in a lengthwise direction of the housing 30. By the pressurization, the valve spring 322 is compressed and the valve stem 310 is slid towards the accommodating space 34. An inner circumferential part of the opening/closing member 311 is pushed to the accommodating space 34 by the sliding of the valve stem 310. Accordingly, the orifice 313 is opened, so that the gas fuel in the accommodating space 34 may be outwardly injected through the valve stem 310 at the hollow portion 3211 of the stem housing 320. When the pressurization is released, the injection of the contents may be stopped.

The valve assembly 300 of the present invention may further include a flow path blocking valve 330 formed to block an inlet of the communication flow path of the stem housing, in order to relieve an overpressure state of the accommodating space 34. Hereinafter, the flow path blocking valve will be explained in more detail with reference to FIGS. 31 to 34.

Figure 31:
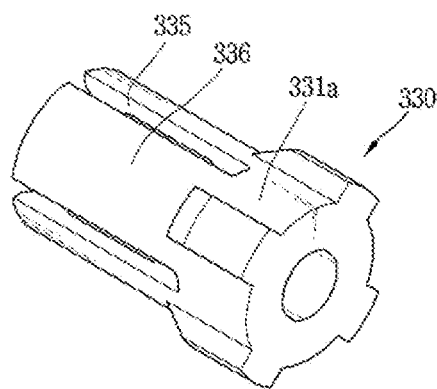
FIG. 31 is a perspective view showing a flow path blocking valve.
Figure 32:
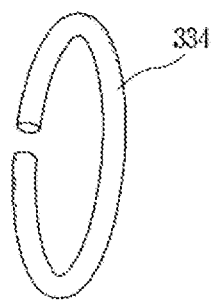
FIG. 32 is a perspective view showing a shape memory alloy mounted to a flow path blocking valve.

FIG. 31 is a perspective view showing a flow path blocking valve, and FIG. 32 is a perspective view showing a shape memory alloy 334 mounted in the flow path blocking valve.

Referring to FIGS. 26 to 29, the valve assembly 300 is provided with the flow path blocking valve 330, in order to prevent an overpressure inside the accommodating space 34.

Referring to FIG. 31, the flow path blocking valve 330 may be formed to be inserted into the communication flow path 323 of the stem housing 320 in parallel, in order to block a point of a passage where gas inside the accommodating space 34 is discharged to the outside.

Here, the insertion part of the flow path blocking valve 330 to the communication flow path 323 may be a part which is arranged in a gravitational direction, for movement of a blocking member 333 in a gravitational direction by release of a locked state when the injection container is mounted to an external device.

Specifically, when the injection container is mounted to an injection container accommodating portion of a gas range (or an external device) in a lying manner horizontally, the flow path blocking valve 330 is arranged so that the notch groove 353 of the mounting cup 35 is towards an upper direction of the injection container accommodating portion, and the second communication flow path portion 3232 of the stem housing 320 is also towards the upper direction. Here, the flow path blocking valve 330 may be inserted into the second communication flow path portion 3232 which is arranged towards an upper direction (that is, a gravitational direction). Thus, the flow path blocking valve 330 is arranged in a gravitational direction, and the blocking member 333 disposed in the flow path blocking valve 330 may be moved by gravity towards the inlet in the gravitational direction when a locked state is released.

The flow path blocking valve 330 includes a body 331, a blocking member 333, and a shape memory alloy 334.

The body 331 is formed to have one side communicated with the communication flow path 323, and another side communicated with the accommodating space 34. And the body 331 is configured so that contents inside the accommodating space 34 are selectively discharged to the outside of the housing 30 through the flow path blocking valve 330.

An external diameter of the body 331 may have a size corresponding to an inner diameter of the communication flow path 323, so as to be fitted into the communication flow path 323. A plurality of fluid grooves 331a for movement of fluid may be provided on at least a part of an outer circumferential surface of the body 331. Contents inside the accommodating space 34 may be move to the communication flow path 323 of the housing 30 through the plurality of fluid grooves 331a.

A locking portion 332 for locking the blocking member 333 may be provided on at least a part of an inner circumferential surface of the body 331. The locking portion 332 may be formed in a bent manner so that at least a part of the inner circumferential surface is towards the center inside the body 331.

The locking portion 332 may be positioned at the inner circumferential surface adjacent to the inlet of the communication flow path 323, in order to prevent the blocking member 333 from blocking the inlet of the communication flow path 323. Thus, the locking portion 332 may restrict a movement of the blocking member 333 so that the blocking member 333 does not block the inlet of the communication flow path 323 unless an external force is applied.

The locking portion 332 may be protruded in a round shape in a bent manner for a smooth movement of the blocking member 333. Alternatively, the locking portion 332 may be protruded in various shapes including a trapezoidal shape, a triangular shape, etc. as well as a rounded shape.

The body 331 may be further provided with a plurality of grooves 335 on at least a part of an outer circumferential surface thereof, so as to be bent, curved, or pulled back by an external force applied by the shape memory alloy 334. The plurality of grooves 335 may be arranged to be spaced from each other in a circumferential direction, along the outer circumferential surface of the body 331. Alternatively, the plurality of grooves 335 may be concavely formed at the outer circumferential surface in a radial direction, and may be extended in a lengthwise direction of the body 331.

An outer circumferential surface 336 of the body 331 may be pulled back towards a direction away from the center inside of the body when an external force is applied by the shape memory alloy 334. Thus, the flow path blocking valve 330 may be bent by a pressure applied to the inner circumferential surface.

The blocking member 333 is arranged in the body 331, and may be formed to be moveable therein. Specifically, the blocking member 333 may free-fall in a gravitational direction once the flow path blocking valve 330 is arranged in a gravitational direction.

The blocking member 333 may have its movement restricted by being locked by the locking portion 332, if no external force has been applied to the inner circumferential surface of the body 331. Accordingly, the blocking member 333 does not reach the inlet of the communication flow path 323, and thereby gas inside the accommodating space 34 flows to the communication flow path 323.

On the contrary, the blocking member 333 may free-fall in a gravitational direction by being locked by the locking portion 332, if an external force has been applied to the inner circumferential surface of the body 331. Accordingly, the blocking member 333 may move towards the inlet of the communication flow path 323. Thus, the inlet of the communication flow path 323 may be blocked.

The blocking member 333 may be a ball of a spherical shape or a steel ball. In this case, the blocking member 333 may be formed to have a diameter larger than a diameter of the inlet of the communication flow path 323, in order to block the inlet of the communication flow path 323 without entering into the communication flow path 323. Thus, the blocking member 333 may effectively block the inlet of the communication flow path 323. And it is obvious to those skilled in the art that the blocking member 333 may be formed to have a polyhedral shape which can block the inlet of the communication flow path, as well as the spherical shape.

Referring to FIG. 32, the shape memory alloy 334 is arranged in the body 331, and may be formed to apply an external force to the inner circumferential surface. More specifically, the shape memory alloy 334 may be attached to the inner circumferential surface, so as to apply an external force to the inner circumferential surface by being deformed when an inner temperature of the accommodating space 34 rises above a preset temperature. Alternatively, the shape memory alloy 334 may be arranged close to the inner circumferential surface.

The external force is a force applied to a direction away from the center of the inner circumferential surface. If an external force is applied to the inner circumferential surface, at least a part of the body 331 may be bent.

The shape memory alloy 334 may have a ring shape or a 'C' shape. Here, both ends of the shape memory alloy 334 are cut-out so as to be spaced apart from each other when an inner temperature of the accommodating space rises above a preset temperature. If the cut-out both ends of the shape memory alloy 334 are widened from each other as the temperature reaches a preset temperature, an entire volume of the shape memory alloy 334 is expanded. Accordingly, the shape memory alloy 334 may pressurize the inner circumferential surface of the body 331.

The shape memory alloy 334 may be arranged in an opposite direction to a direction that the blocking member 333 free-falls, in order to prevent the blocking member 333 from being locked while moving. That is, the shape memory alloy 334 may be arranged at anther end which is in an opposite direction to one end adjacent to the inlet of the communication flow path 323. Accordingly, the blocking member 333 may be positioned between the locking portion 332 and the shape memory alloy 334.

In the above descriptions, the structure of the flow path blocking valve 330 according to the present invention has been explained. Hereinafter, a gas blocking operation by the flow path blocking valve 330 will be explained with reference to FIGS. 33 to 35.

The injection container according to the present invention may reach an overpressure state due to thermal, mechanical or chemical reasons during usage or storage. In this case, the flow path blocking valve 330 may block the stem housing 320 so that contents inside the accommodating space 34 of the housing 30 may not leak to the outside.

Figure 33:
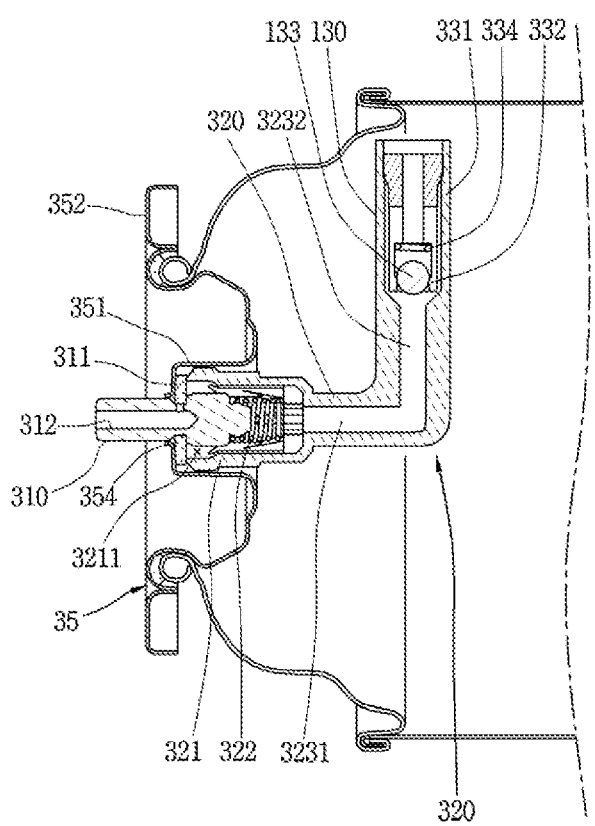
FIG. 33 is a conceptual view showing a mounted state of an injection container according to the present invention to an injection container accommodating portion.

When the injection container is mounted to an injection container accommodating portion of a gas range (or an external device) in a lying manner horizontally, the notch groove 353 of the mounting cup 35 is arranged towards an upper direction of the injection container accommodating portion, and the second communication flow path portion 3232 of the stem housing 320 is also arranged towards the upper direction, as shown in FIG. 33. And the flow path blocking valve 330 inserted into the second communication flow path portion 3232 is also arranged towards the upper direction.

As the flow path blocking valve 330 is arranged towards the upper direction, the blocking member 333 positioned in the flow path blocking valve 330 moves to a downward direction by gravity. The blocking member 333 may be stopped by being locked by the locking portion 332 of the flow path blocking valve 330, while moving to the downward direction.

Figure 34:
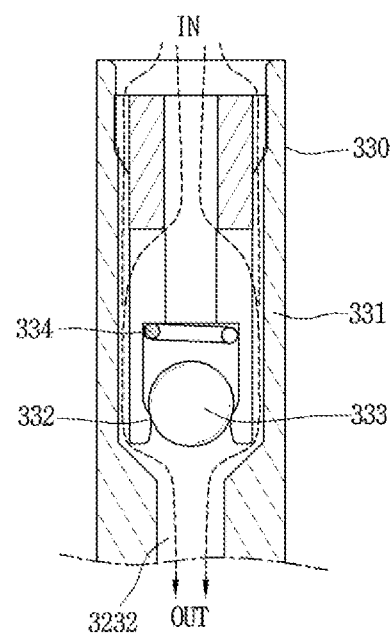
FIGS. 34 and 35 are enlarged view of 'C' in FIG. 29, and are conceptual views showing an operational mechanism to relieve an overpressure state when an overpressure occurs in an accommodating space.

Specifically, referring to FIG. 34 which shows a part 'C' in FIG. 29 in an enlarged manner, the blocking member 333 does not reach the inlet of the communication flow path 323 by being locked by the locking portion 332, but is positioned in the flow path blocking valve 330. Accordingly, contents inside the accommodating space 34 may move to the stem housing 320 by passing through the flow path blocking valve 330.

Figure 35:
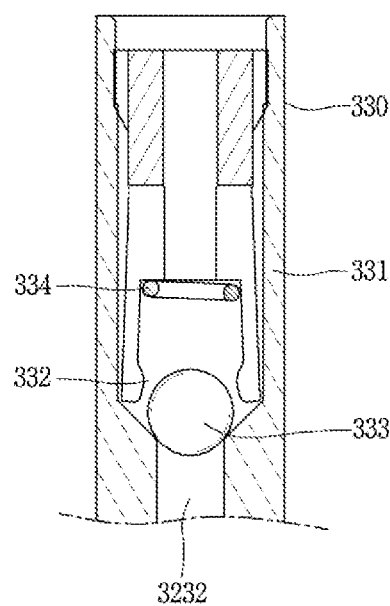

Referring to FIG. 35, the shape memory alloy 334 of the flow path blocking valve 330 is deformed to have its both ends spaced apart from each other, by responding to a temperature of the accommodating space 34 when the temperature reaches a preset temperature. A preset temperature to deform the shape memory alloy 334 may be preferably within a range of 70°~90°.

At the preset temperature, an external force is applied to an inner circumferential surface of the flow path blocking valve 330, due to a deformation of the shape memory alloy 334. As a result, at least a part of the inner circumferential surface of the flow path blocking valve 330 may be bent.

As at least a part of the inner circumferential surface is bent, the locked state of the blocking member 333 by the locking portion 332 at the inner circumferential surface may be released. Once the locked state is released, the blocking member 333 free-falls along the inner circumferential surface, and reaches the inlet of the communication flow path 323. Thus, the inlet of the communication flow path 323 is blocked. Accordingly, contents inside the accommodating space 34 are prevented from being introduced into the communication flow path 323. Under this configuration, an explosion or a secondary fire occurrence may be prevented as the flow path blocking valve 330 prevents an additional pressure increase of the accommodating space 34.

In the injection container and the valve assembly thereof according to the present invention, the flow path blocking valve is provided on the communication flow path of the stem housing, and the shape memory alloy which is deformed at a preset temperature by responding to an inner temperature of the housing is applied to the flow path blocking valve. And when the temperature of the housing reaches the preset temperature, the communication flow path is blocked by a deformation of the shape memory alloy, so that gas does not flow onto the communication flow path of the stem housing. Accordingly, an overpressure state of the injection container can be solved, and a malfunction due to an overpressure state can be prevented.

Further, the flow path blocking valve 300 according to the present invention is formed so that the blocking member of a spherical shape free-falls towards the communication flow path. Accordingly, there is an effect to operate a blocking mechanism more precisely. Further, since the flow path blocking valve according to the present invention does not discharge gas inside the injection container to the outside, a danger of a safety accident can be prevented.

The present invention is not limited to the configurations and methods of the aforementioned embodiments. Rather, the embodiments may be selectively combined to each other wholly or partially, for various modifications.

INDUSTRIAL AVAILABILITY

The present invention may be implemented variously or in an applied manner, in an industrial field which produces and uses an injection container and a valve assembly thereof, the injection container for injecting contents to the outside by using an inner pressure, in a state that the contents (fluid or gas) to be injected are sealed in a housing.

The invention claimed is:

1. An injection container, comprising:
a housing having an upper sealing cap for sealing an upper portion and an accommodating space for containing contents;
a mounting cup mounted on the upper sealing cap, wherein a through hole is formed at a central part thereof;
a stem housing having a mounting portion mounted on the mounting cup, a hollow portion and a communication flow path to communicate with the hollow portion and with the accommodating space, wherein the hollow portion is formed inside the mounting portion;
a valve stem formed to pass through the through hole, slidably disposed in the hollow portion, and providing an orifice to selectively communicate with the hollow portion by sliding; and
a flow path blocking valve for moving a blocking member to block an inlet of the communication flow path by applying an external force to the blocking member when an internal temperature of the accommodating space rises above a preset temperature,
wherein the flow path blocking valve includes:
a body for containing the blocking member therein, and providing at least one cantilever portion formed in a cantilever shape, the body formed in a cylindrical shape and disposed to be inserted into the inlet of the communication flow path; and
a ring member having one side supported by a locking portion protruding from the cantilever portion, and having the other side disposed to contact the blocking member,
wherein the ring member moves the blocking member towards the inside of the communication flow path by deforming the blocking member to pass through a central part of the ring member when the internal temperature exceeds the preset temperature.

2. The injection container of claim 1, wherein a lower end portion of the ring member contacts the locking portion, and wherein an upper end portion of the ring member prevents the blocking member from moving in a direction of gravity, by being arranged to contact the blocking member.

3. The injection container of claim 1, wherein the blocking member is released from a locked state to the cantilever portion by bending of the cantilever portion due to a deformation of the ring member, and is configured to be inserted into the communication flow path after moving towards the inlet of the communication flow path.

4. The injection container of claim 1, wherein a supporting portion is formed to protrude from an inner circumferential surface of the body corresponding to an outer circumferential surface shape of the blocking member to fix a position of the blocking member at one side of the cantilever portion.

5. The injection container of claim 1, wherein the ring member is provided as a shape memory alloy which is deformed in appearance when the temperature rises above the preset temperature,
wherein the ring member is formed in a ring shape such that both ends are spaced apart from each other, and
wherein the ring member is deformed to apply an external force toward a radial direction when the internal temperature rises above the preset temperature.

6. The injection container of claim 1, wherein the blocking member within the body is arranged at an inner side than the ring member.

7. The injection container of claim 1, wherein one side of an inner circumferential surface of the body is connected to the inlet of the communication flow path, and the other side of the inner circumferential surface is connected to the accommodating space such that the communication flow path is blocked by movement of the blocking member.

8. An injection container comprising:
a housing having an upper sealing cap for sealing an upper portion and an accommodating space for containing contents;
a mounting cup mounted on the upper sealing cap, wherein a through hole is formed at a central part thereof;
a stem housing having a mounting portion mounted on the mounting cup, a hollow portion and a communication flow path to communicate with the hollow portion and the accommodating space, wherein the hollow portion is formed inside the mounting portion;
a valve stem formed to pass through the through hole, slidably disposed in the hollow portion, and providing an orifice to selectively communicate with the hollow portion by sliding; and
a flow path blocking valve for moving a blocking member to block an inlet of the communication flow path by applying an external force to the blocking member when an internal temperature of the accommodating space rises above a preset temperature,
wherein the flow path blocking valve includes:
a body for containing the blocking member therein, and providing at least one cantilever portion formed in a cantilever shape, the body formed in a cylindrical shape to be inserted into the inlet of the communication flow path;
a spring arranged inside the body and formed to apply an external force towards a direction of the blocking member; and
a locking portion protruding in the cantilever portion to lock the movement of the blocking member towards the direction,
wherein the blocking member within the body is arranged at an outer side than the spring, and
wherein the blocking member moves towards the inlet of the communication flow path to block the inlet of the communication flow path due to a release of the locking of the blocking member by bending of the cantilever portion when the temperature rises above the preset temperature, and
wherein the blocking member forms a ball of a spherical shape.

9. The injection container of claim 8, wherein the body includes a plurality of grooves, and
wherein the plurality of grooves are separated apart from each other toward a circumferential direction along an outer circumferential surface of the body to form at least one of the cantilever portions.

10. The injection container of claim 9, wherein the cantilever portion is formed of a thermally-deformable material so as to be bendable above a certain temperature.

11. The injection container of claim 9, wherein the flow path blocking valve includes:
a supporting portion to fix a position of the spring such that the spring expands in one direction, and
wherein the supporting portion is arranged apart from the locking portion, and is formed in a shape that an inner circumferential surface of the body protrudes toward inside of the body.

12. An injection container comprising:
a housing having an upper sealing cap for sealing an upper portion and an accommodating space for containing contents;
a mounting cup mounted on the upper sealing cap, wherein a through hole is formed at a central part thereof;
a stem housing having a mounting portion mounted on the mounting cup, a hollow portion and a communication flow path to communicate with the hollow portion and the accommodating space, wherein the hollow portion is formed inside the mounting portion;
a valve stem formed to pass through the through hole, slidably disposed in the hollow portion, and providing an orifice to selectively communicate with the hollow portion by sliding; and
a flow path blocking valve for moving a blocking member to block an inlet of the communication flow path by applying an external force to the blocking member when an internal temperature of the accommodating space rises above a preset temperature,
wherein the flow path blocking valve includes:
a body inserted into the inlet of the communication flow path; and
a shape memory alloy arranged in the body and applying an external force to an inner circumferential surface of the body by being deformed when the internal temperature of the accommodating space rises above the preset temperature, and
wherein the blocking member is located to be locked by a locking portion formed in the body and moves to block the inlet of the communication flow path as its locking state is released when the locking portion is deformed by an external force.

13. The injection container of claim 12, wherein the blocking member is arranged between the locking portion and the shape memory alloy,
- wherein one end portion close to the inlet of the communication flow path and other end portion located in an opposite direction thereto are formed at the body, and
- wherein the shape memory alloy is disposed at the other end portion.

14. The injection container of claim 12, wherein the body is formed such that at least a part of the inner circumferential surface is roundly protruded towards a center of the inside of the body so as to lock the blocking member, and
- wherein one side of the inner circumferential surface of the body is connected with the inlet of the communication flow path, and the other side of the inner circumferential surface is connected with the accommodating space, such that the blocking member reaches the inlet.

15. The injection container of claim 12, wherein the shape memory alloy is formed in a ring shape having both ends thereof spaced apart from each other, and
- wherein the shape memory alloy applies an external force in a direction away from the center of the inner circumferential surface as said both ends are separated from each other when the internal temperature of the accommodating space rises above the preset temperature.

* * * * *